US012711710B2

(12) United States Patent
Turner et al.

(10) Patent No.: US 12,711,710 B2
(45) Date of Patent: Aug. 18, 2026

(54) METHOD AND APPARATUS FOR COMBINING AN AUGMENTED REALITY OBJECT IN A REAL-WORLD IMAGE

(71) Applicant: GOOGLE LLC, Mountain View, CA (US)

(72) Inventors: Eric Turner, Somerville, MA (US); Keisuke Tateno, Zurich (CH); Konstantine Nicholas John Tsotsos, Corte Madera, CA (US); Adarsh Prakash Murthy Kowdle, San Francisco, CA (US); Vaibhav Gupta, Seattle, WA (US); Ambrus Csaszar, Millbrae, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/998,903

(22) PCT Filed: May 22, 2020

(86) PCT No.: PCT/US2020/070069

§ 371 (c)(1),
(2) Date: Nov. 15, 2022

(87) PCT Pub. No.: WO2021/236173

PCT Pub. Date: Nov. 25, 2021

(65) Prior Publication Data

US 2023/0186575 A1 Jun. 15, 2023

(51) Int. Cl.
*G06T 19/00* (2011.01)
*G06T 1/60* (2006.01)

(52) U.S. Cl.
CPC .............. *G06T 19/006* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 8,462,155 | B1 * | 6/2013 | Allen | G06T 15/20 345/420 |
| 9,443,350 | B2 | 9/2016 | Wagner et al. | |

(Continued)

FOREIGN PATENT DOCUMENTS

| | | | |
|---|---|---|---|
| CN | 104956404 | A | 9/2015 |
| CN | 105191287 | A | 12/2015 |

(Continued)

OTHER PUBLICATIONS

International Search Report and Written Opinion for PCT Application No. PCT/US2020/070069, mailed on Jan. 22, 2021, 12 pages.

(Continued)

*Primary Examiner* — Daniel F Hajnik
*Assistant Examiner* — Jed-Justin Imperial
(74) *Attorney, Agent, or Firm* — Brake Hughes Bellermann LLP

(57) ABSTRACT

A method including receiving a first depth image associated with a first frame at a first time of an augmented reality (AR) application, the first depth image representing at least a first portion of a real-world space storing the first depth image receiving a second depth image associated with a second frame at a second time, after the first time, of the AR application, the second depth image representing at least a second portion of the real-world space generating a real-world image by blending, at least, the stored first depth image with the second depth image receiving a rendered AR object combining the AR object in the real-world image and displaying the real-world image combined with the AR object.

20 Claims, 17 Drawing Sheets

(56) References Cited

U.S. PATENT DOCUMENTS

| | | | | |
|---|---|---|---|---|
| 10,586,343 | B1 * | 3/2020 | Whelan | G06T 7/521 |
| 10,867,432 | B2 | 12/2020 | Lodato et al. | |
| 2011/0102438 | A1 * | 5/2011 | Mathe | A63F 13/52 345/426 |
| 2013/0114886 | A1 | 5/2013 | Kotake et al. | |
| 2014/0140579 | A1 | 5/2014 | Takemoto | |
| 2015/0189144 | A1 | 7/2015 | Yoshii | |
| 2016/0210787 | A1 | 7/2016 | Chu et al. | |
| 2017/0116708 | A1 | 4/2017 | Imber et al. | |
| 2018/0350134 | A1 | 12/2018 | Lodato et al. | |
| 2019/0147220 | A1 | 5/2019 | Mccormac et al. | |
| 2020/0221062 | A1 * | 7/2020 | Zhou | H04N 13/271 |
| 2021/0065392 | A1 * | 3/2021 | Bleyer | H04N 13/254 |
| 2021/0082192 | A1 * | 3/2021 | Guo | G06F 16/9024 |
| 2021/0319569 | A1 * | 10/2021 | Peri | G06V 10/44 |
| 2021/0337175 | A1 | 10/2021 | Zhou et al. | |
| 2022/0343525 | A1 * | 10/2022 | Garg | G06T 5/70 |

FOREIGN PATENT DOCUMENTS

| | | | |
|---|---|---|---|
| CN | 106796718 | A | 5/2017 |
| CN | 108496201 | A | 9/2018 |
| JP | 2012026895 | A | 2/2012 |
| JP | 2014106543 | A | 6/2014 |
| JP | 2015125621 | A | 7/2015 |
| JP | 2016514384 | A | 5/2016 |
| JP | 2019125345 | A | 7/2019 |
| KR | 20200012875 | A | 2/2020 |
| WO | 2018223152 | A1 | 12/2018 |
| WO | 2019030235 | A1 | 2/2019 |
| WO | 2019123729 | A1 | 6/2019 |

OTHER PUBLICATIONS

Izadi, et al., "Kinectfusion: Feal-Time 3D Reconstruction and Interaction Using a Moving Depth Camera*", UIST' 11, Oct. 16-19, 2011, 10 pages.

Pfister, et al., "Surfels: Surface Elements as Rendering Primitives", SIGGRAPH 2000, pp. 335-342.

* cited by examiner 405
410
415
425

405
410
415
420
425

405
410
415
420
425-1
425-2

405
410
415
420
425-2

METHOD AND APPARATUS FOR COMBINING AN AUGMENTED REALITY OBJECT IN A REAL-WORLD IMAGE

CROSS REFERENCE TO RELATED APPLICATION

This application is a 35 U.S.C. § 371 National Phase Entry Application from PCT/US2020/070069 filed May 22, 2020, designating the U.S., the disclosure of which is incorporated herein by reference in its entirety.

FIELD

Embodiments relate to scene representations in augmented reality systems.

BACKGROUND

Augmented reality (AR) can include fusing three-dimensional (3D) graphics with real-world geometry. As a 3D object moves around in the real-world geometry, the 3D object can appear in front of or behind real-world objects when rendered on an AR display. For example, a humanoid object can appear in front of or behind a piece of furniture, a half-wall, a tree, and/or the like in the real-world geometry when rendered on the AR display.

However, current AR systems can have inaccurate and/or unstable depth data that can cause portions of a real-world object and/or the 3D object to appear (e.g., at a correct depth and/or position) and/or not appear when rendered on the AR display. For example, when the humanoid moves out from behind a real-world object (e.g., a half-wall), a portion of the humanoid (e.g., legs) may not appear when rendered on the AR display when the portion of the humanoid should appear. Alternatively, when the humanoid moves to a position behind a real-world object (e.g., a half-wall), a portion of the humanoid (e.g., legs) may appear when rendered on the AR display when the portion of the humanoid should not appear. This can result in a less than desired user experience in current AR systems.

SUMMARY

In a general aspect, an apparatus, including one or more processors, and a memory storing instructions, a device, a system, a non-transitory computer-readable medium (having stored thereon computer executable program code which can be executed on a computer system), and/or a method can perform a process with a method including receiving a first depth image associated with a first frame at a first time of an augmented reality (AR) application, the first depth image representing at least a first portion of a real-world space storing the first depth image receiving a second depth image associated with a second frame at a second time, after the first time, of the AR application, the second depth image representing at least a second portion of the real-world space generating a real-world image by blending, at least, the stored first depth image with the second depth image receiving a rendered AR object combining the AR object in the real-world image and displaying the real-world image combined with the AR object.

Implementations can include one or more of the following features. For example, the first depth image can be one of a plurality of depth images representing frames of the AR application stored in a buffer associated with the AR application. The first depth image can be one of a plurality of depth images representing frames of the AR application stored in a buffer associated with the AR application, the method can further include selecting a portion of the plurality of depth images stored in the buffer generating a data structure based on the portion of the plurality of depth images, the data structure representing the real-world space, the data structure including depth information, position information, and direction information and storing the generated data structure. The first depth image can be one of a plurality of depth images representing frames of the AR application stored in a buffer associated with the AR application, the method can further include receiving a portion of the plurality of depth images stored in the buffer generating a plurality of surface elements (surfels) based on the portion of the plurality of depth images, the plurality of surfels representing the real-world space and storing the generated plurality of surfels.

For example, the method can further include receiving a data structure including depth information, position information, and direction information rendering the data structure as a third depth image and blending the third depth image with the real-world image. The method can further include receiving a plurality of surfels representing the real-world space rendering the plurality of surfels as a third depth image and blending the third depth image with the real-world image. The combining of the AR object in the real-world image can include replacing a portion of pixels in the real-world image with a portion of pixels in the AR object based on depth. The blending of the stored first depth image with the second depth image can include replacing a portion of pixels in the second depth image with a portion of the stored first depth image. The second depth image can be missing at least one pixel and blending the stored first depth image with the second depth image can include replacing the at least one pixel with a portion of the stored first depth image. The method further includes receiving a plurality of surfels representing the real-world space and rendering the plurality of surfels. The second depth image can be missing at least one pixel, and the method further includes replacing the at least one pixel with a portion of the rendered plurality of surfels. The stored first depth image can include a position confidence indicating a likelihood that the first depth image represents the real-world space at a position.

In another general aspect, an apparatus, including one or more processors, and a memory storing instructions, a device, a system, a non-transitory computer-readable medium (having stored thereon computer executable program code which can be executed on a computer system), and/or a method can perform a process with a method including receiving a depth data associated with a frame of an augmented reality (AR) application, the depth data representing at least a portion of a real-world space storing the depth data as one of a plurality of depth images representing frames of the AR application in a buffer associated with the AR application selecting a portion of the plurality of depth images stored in the buffer generating a data structure based on the portion of the plurality of depth images, the data structure representing the real-world space, the data structure including depth information, position information, and direction information and storing the generated data structure.

Implementations can include one or more of the following features. For example, the data structure can include a plurality of surface elements (surfels). The data structure can be stored in association with a server. The selecting of the portion of the plurality of depth images can include selecting the plurality of images from a plurality of buffers on a plurality of devices executing the AR application. The stored depth data can include a position confidence indicating a likelihood that the depth data represents the real-world space at a position.

In still another general aspect, an apparatus, including one or more processors, and a memory storing instructions, a device, a system, a non-transitory computer-readable medium (having stored thereon computer executable program code which can be executed on a computer system), and/or a method can perform a process with a method including receiving a first depth data associated with a frame of an augmented reality (AR) application, the first depth data representing at least a portion of a real-world space receiving a data structure representing at least a second portion of the real-world space associated with the AR application, the data structure including depth information, position information, and direction information generating a real-world image by blending, at least, the first depth data with the data structure receiving an AR object combining the real-world image with the AR object and displaying the real-world image combined with the AR object.

Implementations can include one or more of the following features. For example, the combining of the AR object in the real-world image can include replacing a portion of pixels in the real-world image with a portion of pixels in the AR object based on depth. The blending of the stored first depth data with the data structure can include replacing a portion of pixels in the second depth image with a portion of the stored first depth image. The first depth data can be missing at least one pixel and blending the first depth data with the data structure can include replacing the at least one pixel with a portion of the data structure. The data structure can include a plurality of surface elements (surfels). The data structure can include a plurality of surfels, and the first depth data can be missing at least one pixel, the method can further include replacing the at least one pixel with a portion of the plurality of surfels. The data structure representing the real-world space can include a position confidence indicating a likelihood that the depth data represents the real-world space at a position. The data structure can be received from a server.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

At least one problem with current augmented reality (AR) systems is the possibility of a delay in depth processing of a three-dimensional (3D) object as the 3D object moves about in a real-world space (e.g., geometry). For example, inaccurate rendering (e.g., depth and/or position) of a portion of the 3D object can occur as the 3D object moves from behind an object in the real-world geometry (e.g., a real-world object). Example implementations solve this problem by storing depth data associated with real-world objects and using the stored depth data when fusing and rendering 3D objects with the real-world geometry. At least one benefit of this technique is object depth and/or position processing as a 3D object changes position in the real-world geometry can be more accurate. More accuracy in depth processing can result in a more desirable user experience as compared to current AR systems.

In an example implementation, input depth frames can be accumulated in a buffer. As an AR video (e.g., as captured by a camera) progresses from frame-to-frame, a previous frame(s) data (stored in the buffer) is re-projected into the current frame. In other words, the latest input values are merged with previous values. This data merging process can be based on statistical analysis of the errors in the input depth frame and/or accumulated depth frame.

Figure 1A:
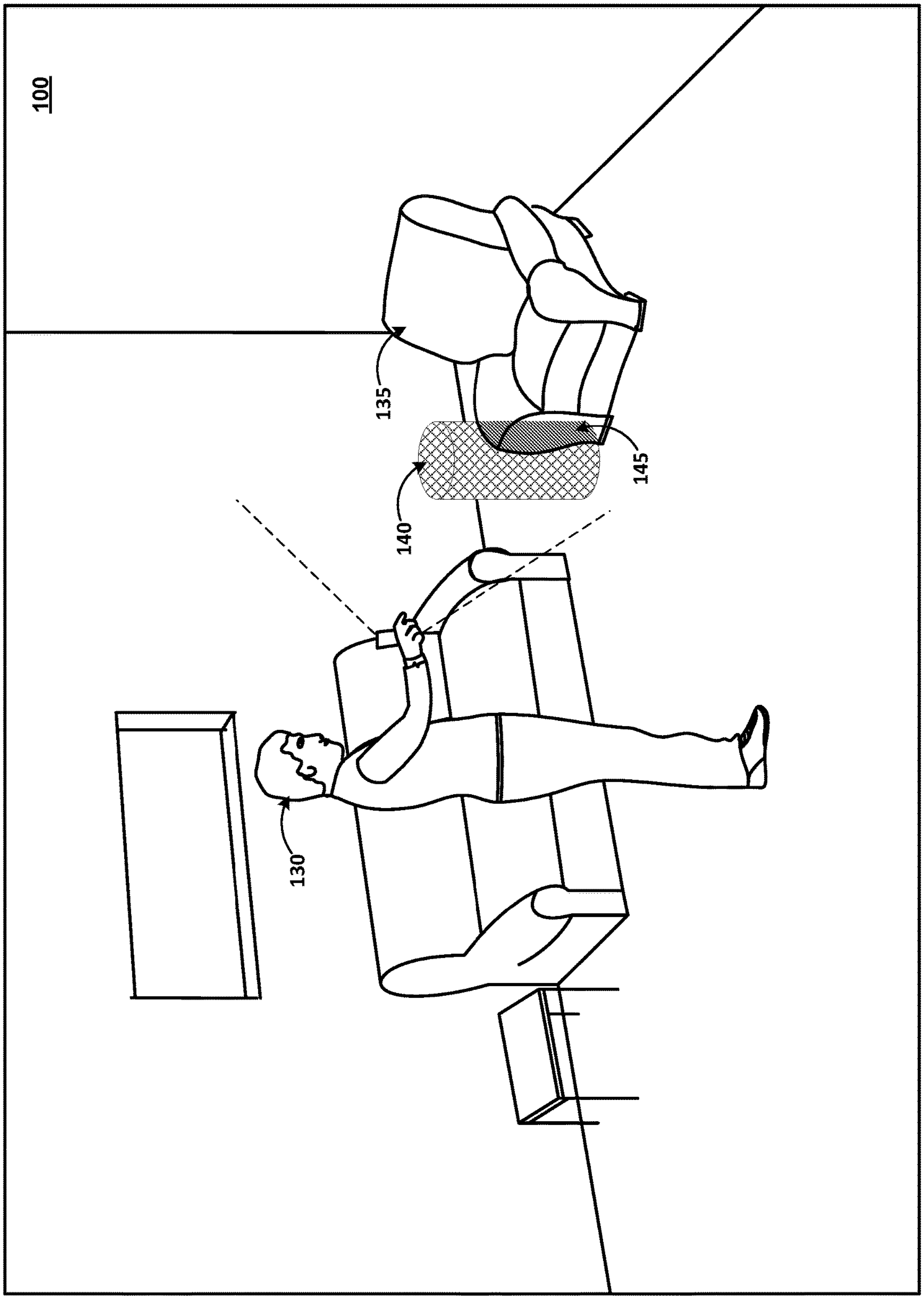
FIGS. 1A, 1B and 1C illustrate a real-world space according to an example implementation.

FIG. 1A illustrates a real-world space 100, and illustrates a user 130 in the real-world space 100. Real-world objects and AR objects are illustrated in this figure together as they would be seen by the user 130 via a mobile device. A scene (e.g., of a room) viewed by a user 130 of an AR system is illustrated with the dashed lines. The real-world space 100 can include at least one real-world object 135. The AR system associated with the mobile device can be configured to place an AR object 140 in the real-world space 100. FIG. 1A illustrates the AR object 140 placed at a depth behind the real-world object 135. However, only a portion of the AR object 145 (greyed out) is behind the real-world object 135 based on depth and position of the real-world object 135 as compared to depth and position of the AR object 140.

Figure 1B:
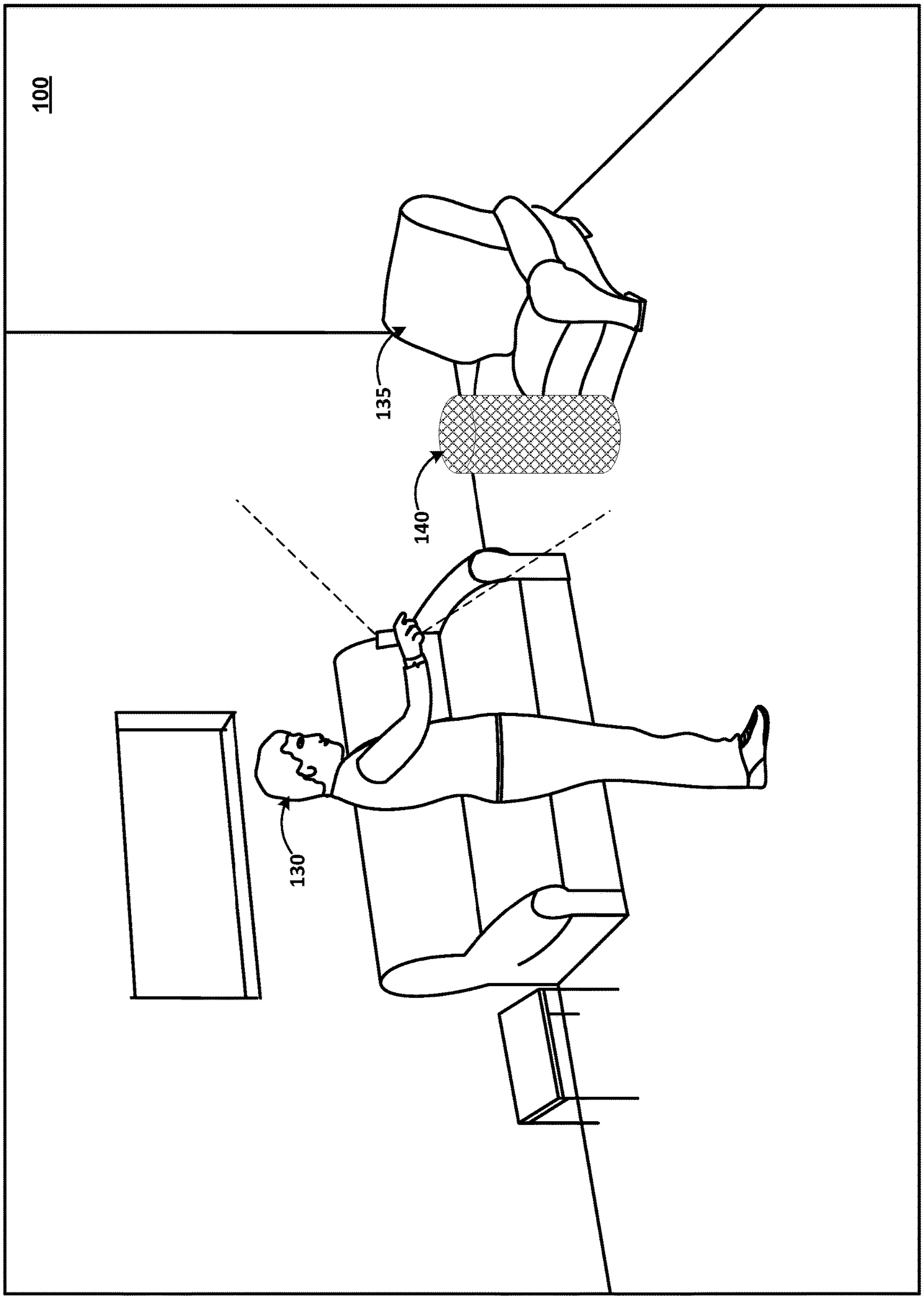
Figure 1C:
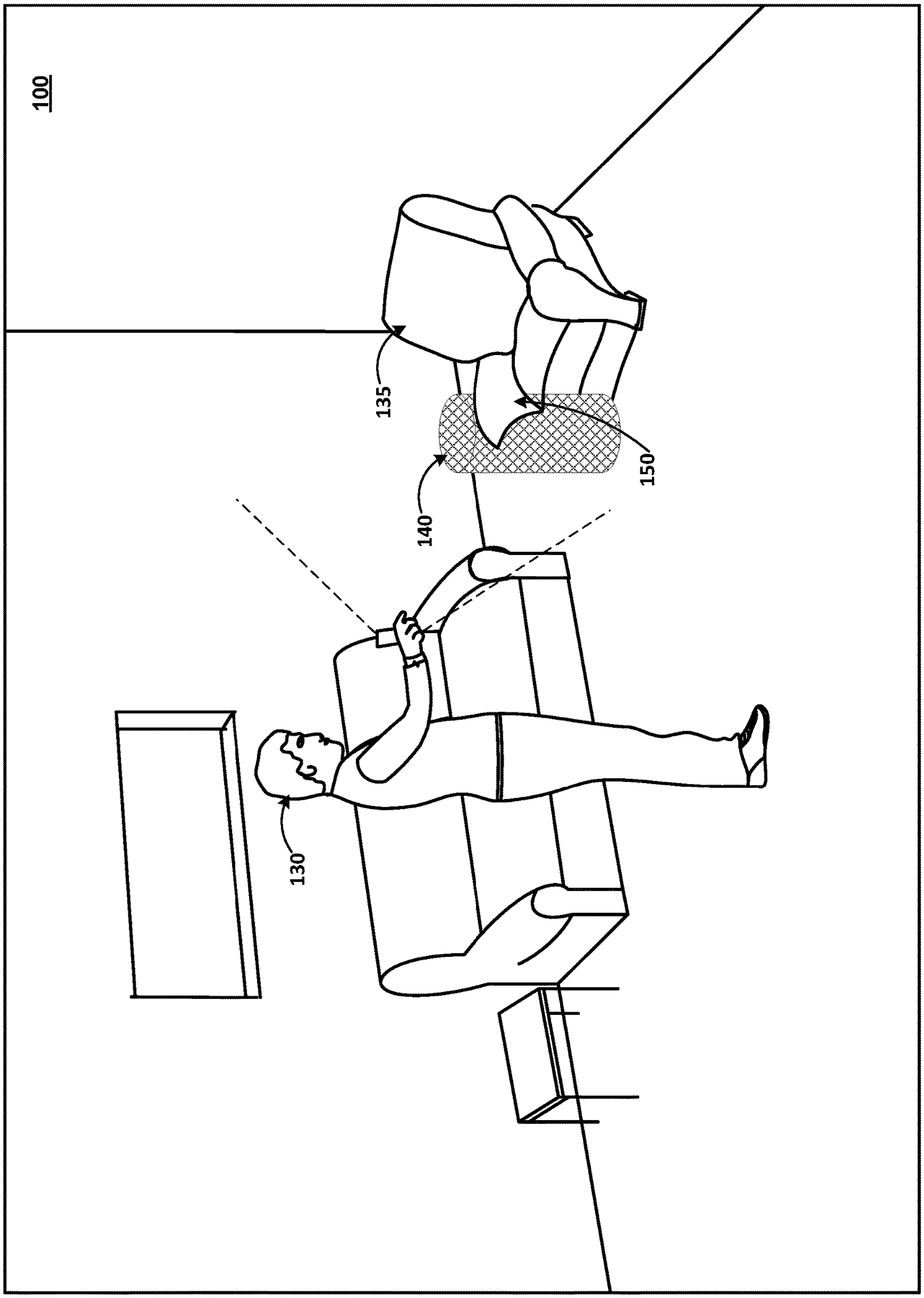

FIG. 1B again illustrates the AR object 140 in the real-world space 100. In FIG. 1B the AR object has been repositioned and placed at a depth in front of the real-world object 135. FIG. 1C again illustrates the AR object 140 in the real-world space 100. In FIG. 1C the AR object remains in a place that is at a depth in front of the real-world object 135. However, depth processing (e.g., missing depth data and/or a lack of accurate depth data) of the real-world object 135 has lagged the rendering of the real-world space 100 (e.g., on a display of the AR system). This delay in depth processing or data acquisition is illustrated as a portion of the real-world object 150 being in front of the AR object 140 when all of the AR object 140 should be rendered in front of the real-world object 135.

FIG. 1C illustrates an undesirable result when rendering the real-world space 100. The result illustrated by FIG. 1C can occur if depth information associated with the real-world space 100 (and more specifically as relates to the real-world object 135) is incomplete. This result can occur if the depth information is incomplete after the AR object 140 is moved and/or should the user 130 look away from the real-world object 135 and then look back to the real-world object 135. For example, FIG. 1A can correspond to a first frame in the AR system, FIG. 1B and/or FIG. 1C can correspond to a frame sequentially after the frame corresponding to FIG. 1A.

According to an example implementation, depth information associated with the frame corresponding to FIG. 1A can be stored in memory (e.g., a buffer). The depth information can be stored as a geometry (as described in more detail below) generated based on the real-world space 100 and or a rendering (e.g., a plurality of pixels including depth) of the real-world space 100. A frame rendered sequentially after the frame corresponding to FIG. 1A can use the stored depth information. This can result in a rendering using complete depth information (as related to real-world object 135). Therefore, the frame after the AR object 140 is moved includes complete depth information (as related to real-world object 135) and may be rendered as illustrated in FIG. 1B. Example implementations can prevent or minimize the rendering as illustrated in FIG. 1C.

Figure 1D:
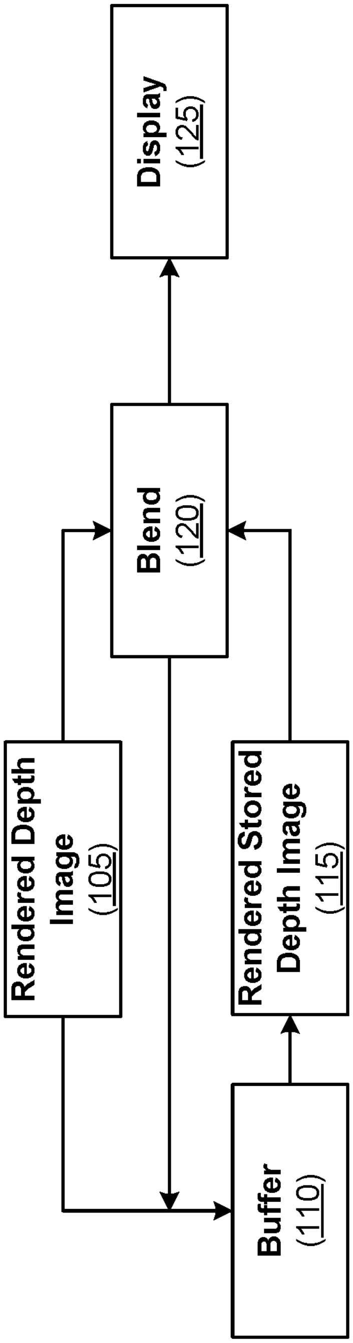
FIG. 1D illustrates a block diagram of a signal flow for generating an augmented reality image according to an example implementation.

FIG. 1D illustrates a block diagram of a signal flow for generating an augmented reality (AR) image according to an example implementation. As shown in FIG. 1D, the signal flow includes a rendered depth image 105 block, a buffer 110 block, a rendered stored image 115 block, a blend 120 block, and a display 125 block.

In example implementations, depth data associated with an image seen by a user via a mobile device (e.g., as illustrated in FIG. 1A) can correspond to the rendered depth image 105 and can be stored in the buffer 110. Frame after frame can be captured and displayed by the mobile device. Each of these frames can be stored in the buffer 110. These stored frames can be used to generate more complete depth data representing the depth of objects in the real-world space 100. As new frames are rendered (e.g., as illustrated in FIG. 1B) stored depth data can be used to supplement (or blended with as represented by the blend 120 block) depth data associated with a current rendering of the real-world space 100. As such, when an AR object (e.g., AR object 140) is repositioned (or a new AR object is positioned), the AR object can be rendered at the correct depth in relation to a real-world object(s).

The rendered depth image 105 block can be the rendering of an image (or a frame of a video) having been captured by a camera of a device (e.g., a mobile phone, a tablet, a headset, and/or the like) executing an AR application. The rendered depth image 105 (or associated depth data) can be stored in the buffer 110. In example implementations, a plurality of rendered depth images can be stored or accumulated in the buffer 110. Accumulated frames of rendered depth images can represent a plurality of rendered depth images 105 being stored in buffer 105. Alternatively, or in addition to, accumulated frames can represent blended depth images being stored in buffer 105 (as represented by the dashed line). An accumulation of blended depth images can result in missing or invalid depth data being replaced by valid depth data over time. In other words, as the AR system captures images, valid depth data from the captured images can build up (and be stored) over time. The plurality of rendered depth images (or depth images) represent frames of the AR application.

The rendered depth image 105 block can include an image having depth information and/or color information. The depth information can include a depth map having a depth value for each pixel in an image. The depth information can include depth layers each having a number (e.g., an index or z-index) indicating a layer order. The depth information can be a layered depth image (LDI) having multiple ordered depths for each pixel in an image. Color information can be color (e.g., RGB, YUV, and/or the like) for each pixel in an image. A depth image can be an image where each pixel represents a distance from the camera location. In some cases, an input depth image can be a sparse image, where a portion (e.g., some or most) of the pixels can be blank or marked as invalid.

The rendered stored depth image 115 block can be the rendering of an image retrieved from a storage (e.g., memory) of a device (e.g., a mobile phone, a tablet, a headset, and/or the like) executing an AR application and/or a server having a memory accessible using the device executing the AR application. As is shown, the rendered stored depth image 115 block can be read from the buffer 110. The rendered stored depth image 115 block can include an image having depth information and/or color information. The depth information can include a depth map having a depth value for each pixel in an image. The depth information can include depth layers each having a number (e.g., an index or z-index) indicating a layer order. The depth information can be a layered depth image (LDI) having multiple ordered depths for each pixel in an image. Color information can be color (e.g., RGB, YUV, and/or the like) for each pixel in an image.

The blend 120 block is configured to blend the rendered depth image 105 with the rendered stored depth image 115 and the display 125 block is configured to display the resultant blended image. In an example implementation, the blended image (or associated depth data) can be stored in the buffer 110. In example implementation, a plurality of blended images can be stored or accumulated in the buffer 110.

Blending two or more depth images can include combining portions of each image. For example, data (e.g., depth data, color data, pixels, and/or the like) that is missing from the rendered depth image 105 block can be filled in using data from the rendered stored depth image 115 block. For example, pixels having the same position and/or same position and same depth can be combined. The position can be based on a distance and direction from the point of reference (or home position). The position can be based on a coordinate system (e.g., x, y grid).

As mentioned above, a portion of the pixels in a depth image can be blank or marked as invalid. Therefore, in an example implementation, a pixel that is missing or marked as invalid in the rendered depth image 105 can be filled in with a pixel from the rendered stored depth image 115 having the same position and layer as the missing or invalid pixel. In an example implementation, a pixel from the rendered depth image 105 and the rendered stored depth image 115 have the same position and are at a layer having the same index value. Blending the two images can include selecting the pixel from the rendered stored depth image 115 and discarding the pixel from the rendered depth image 105. Alternatively, blending the two images can include selecting the pixel from the rendered depth image 105 and discarding the pixel from the rendered stored depth image 115. Alternatively, blending the two images can include averaging the color and assigning the averaged color to the position and the layer. Other techniques for blending two images are within the scope of this disclosure.

Figure 2:
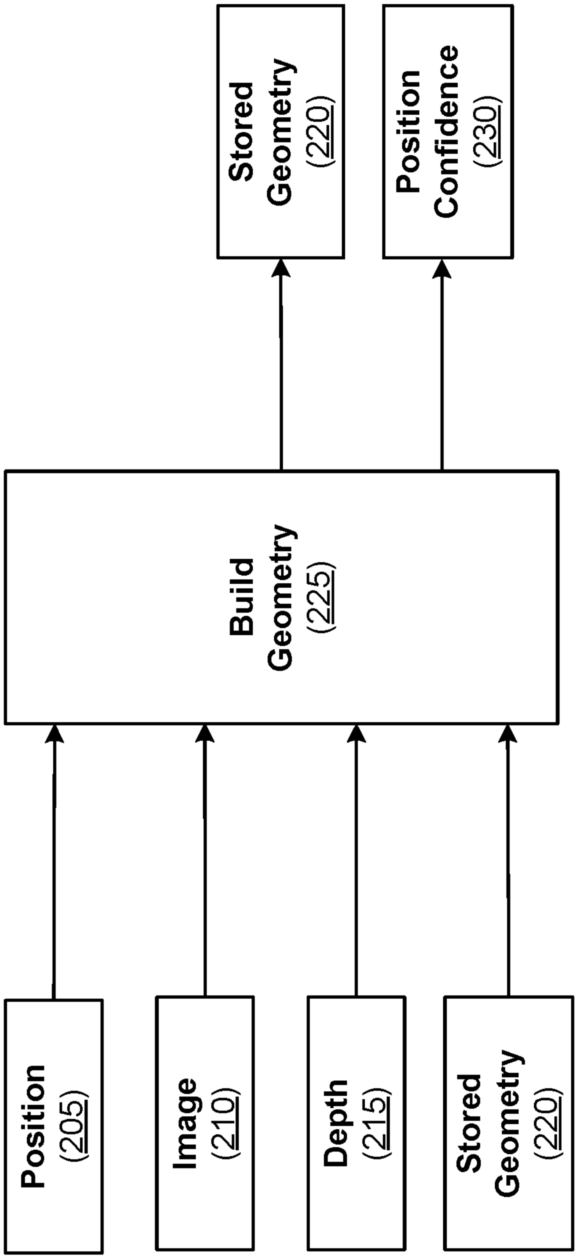
FIG. 2 illustrates a block diagram of a signal flow for storing a geometry according to an example implementation.

FIG. 2 illustrates a block diagram of a signal flow for storing a geometry according to an example implementation. As shown in FIG. 2, the signal flow includes a position 205 block, an image 210 block, a depth 215 block, a stored geometry 220 block, a build geometry 225 block, and a position confidence 230 block. The image 210 block can be data associated with an image captured by a camera of an AR system. The depth 215 block can be depth data captured by a depth sensor associated with the AR system and/or calculated based on the image data.

Each image captured by an AR system (e.g., a camera of the AR system) can include color data (represented by image 210 block) and depth data (represented by depth 215 block). The camera capturing the image can be in a position within the real-world space (e.g., real-world space 100) and be pointed in a direction within the real-world space. The position and direction can be represented by the position 205 block). The position 205, the image 210 and the depth 215 can be used to generate geometry data associated with the real-world space (represented by the build geometry 225 block). The generated geometry can be added to previously generated geometry and stored. Adding geometry can also include replacing and/or replacing data. The geometry can include data representing objects in the real-world space. How certain data representing an object corresponds to an object at a position can be determined and saved (represented by the position confidence 230 block).

The position 205 block can be location information associated with the AR system. The location information can be associated with a point of reference (e.g., a beginning (reference, or home) location in the real-world geometry) and/or a global point of reference (e.g., from a global positioning sensor). The position 205 can be a distance and direction from the point of reference (or home position). The position 205 can be based on a coordinate system (e.g., x, y grid) and direction.

The build geometry 225 block can be configured to generate a data structure (e.g., a n-tuple, a tree, and/or the like) representing the real-world geometry associated with the AR system. The build geometry 225 block can generate the data structure for a position. In some implementations, the position 205, the image 210 and the depth 215 can be read from the buffer 110. The build geometry 225 block can generate the data structure using the image 210, the depth 215 and the position 205. In other words, the data structure can include color information, texture information, depth information, position information, and direction information. The depth information can include depth layers each having a number (e.g., an index or z-index) indicating a layer order. The depth information can be a layered depth image (LDI) having multiple ordered depths for each pixel in an image. The depth information can include depth map. Texture information, depth information, position information, and direction information can be elements of a geometric object having connectivity (e.g., a mesh of polygons). Texture information, depth information, position information, and direction information can be elements of a geometric object without connectivity (e.g., a surface element or surfel). Further, depth data can be stored in a grid-based data structure, such as voxels or octree, which can store a signed-distance function (SDF) at a sampling in 3D space. The build geometry 225 block can add the data structure to the stored geometry 220.

The build geometry 225 block can also generate a confidence value based on a comparison of the data structure having just been generated to a stored data structure (e.g., previously generated). The more similar the data structure having just been generated is to the stored data structure the greater the position confidence is. In other words, if a there is a close match between two data structures for a position, there is a somewhat high probability (e.g., high confidence) that using the stored data structure to render an image will result in an accurate image for a current real-world scene. The position confidence can indicate a likelihood that, the data, the data structure, a portion of the data structure, the depth data, and/or the like represents the real-world space at a position A Layered Depth Image (LDI) can be an image-base representation of a three-dimensional (3D) scene. An LDI can include a two-dimensional (2D) array or group of layered depth pixels. Each layered depth pixel can include a set of LDI samples sorted along one line of sight as viewed from a single camera position or perspective. The camera can be referred to as an LDI camera. Other ways of referring to an LDI sample can include, but are not limited to, a point, a depth pixel, or a layered depth pixel sample. For each LDI sample, a camera, referred to as a source camera, provides data associated with the LDI sample. A representation of a LDI pixel can include color information, alpha channel information, depth information (a distance between the pixel and the camera), an identifier for a source camera for an LDI sample (e.g., a number, a pointer or a reference to the camera), and other attributes that can support the rendering of the LDI in a three-dimensional (3D) space. For example, the alpha channel information can be used to determine an opacity level for the pixel.

An LDI sample in its partition plane can be projected to a point in the source camera window space. The source camera window space can include a plurality of pixels. The point can be projected into at least one pixel included in an image plane of the source camera. The point can then be projected from the source camera window space back into the partition plane. The projecting can result in a surface element (surfel) at a location of the point in the partition plane. The size of a surfel can be determined by an image filter defined in a source camera window space that can be referred to as a source filter. The surfel can have an associated color based on the color of the pixel the point was projected into in the image plane of the source camera.

A target camera that includes a target camera window space can be selected. A surfel in the partition plane can be projected into a surfel footprint in the target camera window space. The surfel footprint can cover, overlap, or include one or more pixels included in an image plane of the target camera window space. The one or more pixels can be filled with the color and/or depth associated with the surfel. Each of the one or more pixels can include a plurality of pixel samples or points. Each of the plurality of pixel samples can be projected from the target camera window space to the partition plane. Each of the plurality of pixel samples can be projected from the partition plane and into the source camera window space identifying a current location for each pixel sample in the source camera window space. A color weight can be applied to each pixel sample based on the identified current location of each pixel sample in the source camera window space. The partition plane and the texture map can be combined to form a model of a scene for rendering in real time in 3D in an AR space.

FIGS. 3A-E are block diagrams that illustrate a rasterizing of a surface element (surfel) included in a partition plane. An application executing in a computing system can generate images of a scene from various positions within a field of view of a device (e.g., a mobile phone, a tablet, a headset, and/or the like) executing the AR application. Each scene image can include a plurality of pixel samples or points that include associated color information, depth information, and a value for a surface normal. A point can be a location in 3D space that has no volume, no size, and no extent. A point can represent a location of a pixel as seen through the center of a pixel from a center of a source camera. The number of pixels in a view of an image is determined based on a resolution of the image.

For example, a pixel when projected into a representation of a surface can be considered a surfel. Surfels can be used to efficiently render complex geometric objects in a 3D space in real-time (at interactive frame rates). Surfels can include one or more samples (points) that are included in a raw LDI. A surfel can be a point primitive that lacks any specific connectivity. As such, surfels can be used to model dynamic geometry because topology information, such as adjacency information, does not need to be computed. Attributes of a surfel can include, but are not limited to, depth, texture color, and a normalized vector and position.

Each scene image can be assembled into a data structure (e.g., an LDI) that can be used in a representation of a simplified version of the scene for rendering (drawing) in real time in 3D in an AR space by an AR application. For example, the plurality of pixel samples or points can be grouped into multiple partitions. A partition can be a plane or a polygon that includes a subset of the plurality of pixel samples or points that represent the scene image. A partition plane (e.g., partition plane 304) can be at a location in the 3D image space where the subset of points are located within the 3D space. In some implementations, a quadrangulation algorithm can create polygon approximations that can be used to create a partition plane. In some implementations, an iterative partitioning algorithm can create the polygon approximations that can be used to create a partition plane.

A texture map can be created (generated) for each partition plane. Each partition plane and its associated texture map can be combined to form a model (a simplified representation) of the scene for rendering (drawing) in real time in 3D in an AR space by the AR application. The algorithm executed by the AR application when rendering the model of the scene can be based on the algorithm used to create each of the partition planes.

Figure 3A:
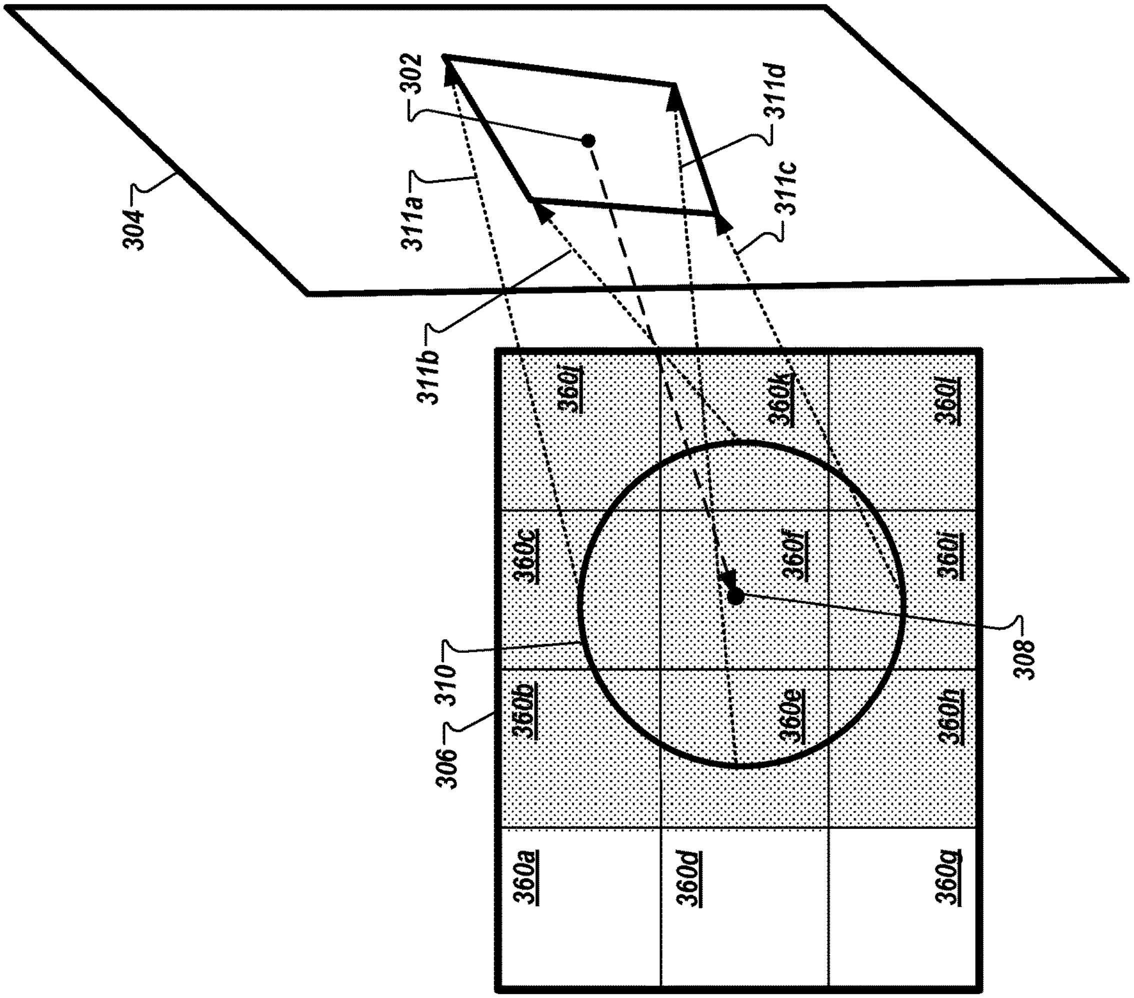
FIGS. 3A, 3B, 3C, 3D and 3E are block diagrams that illustrate a rasterizing of a surface element (surfel) included in a partition plane.

Referring to FIG. 3A, the points included in a partition plane are rasterized in order to create (generate) a texture map for the partition plane. Point 302 can be one of many points included in the partition plane 304. A color for each point included in the partition plane is incorporated into the texture map. A texture rasterizing algorithm can create (generate) a texture map for a given partition plane that includes RGBA textures.

Referring, for example, to FIGS. 3A-E, the texture rasterizer can select a source camera that includes a source camera window space 306 that can be an image plane of the source camera. The texture rasterizer can select a target camera that includes a target camera window space 336 that can be an image plane of the target camera. The texture rasterizer can select the source camera and the target camera for a given partition plane where the partition plane includes samples (points) from a raw LDI. In some implementations, a selection of a target camera is based on a camera that has the best view of the partition plane. In some implementations, the source camera is the camera that provided (generated) the samples included in the raw LDI. In some implementations, the target camera can be a virtual camera.

Figure 3B:
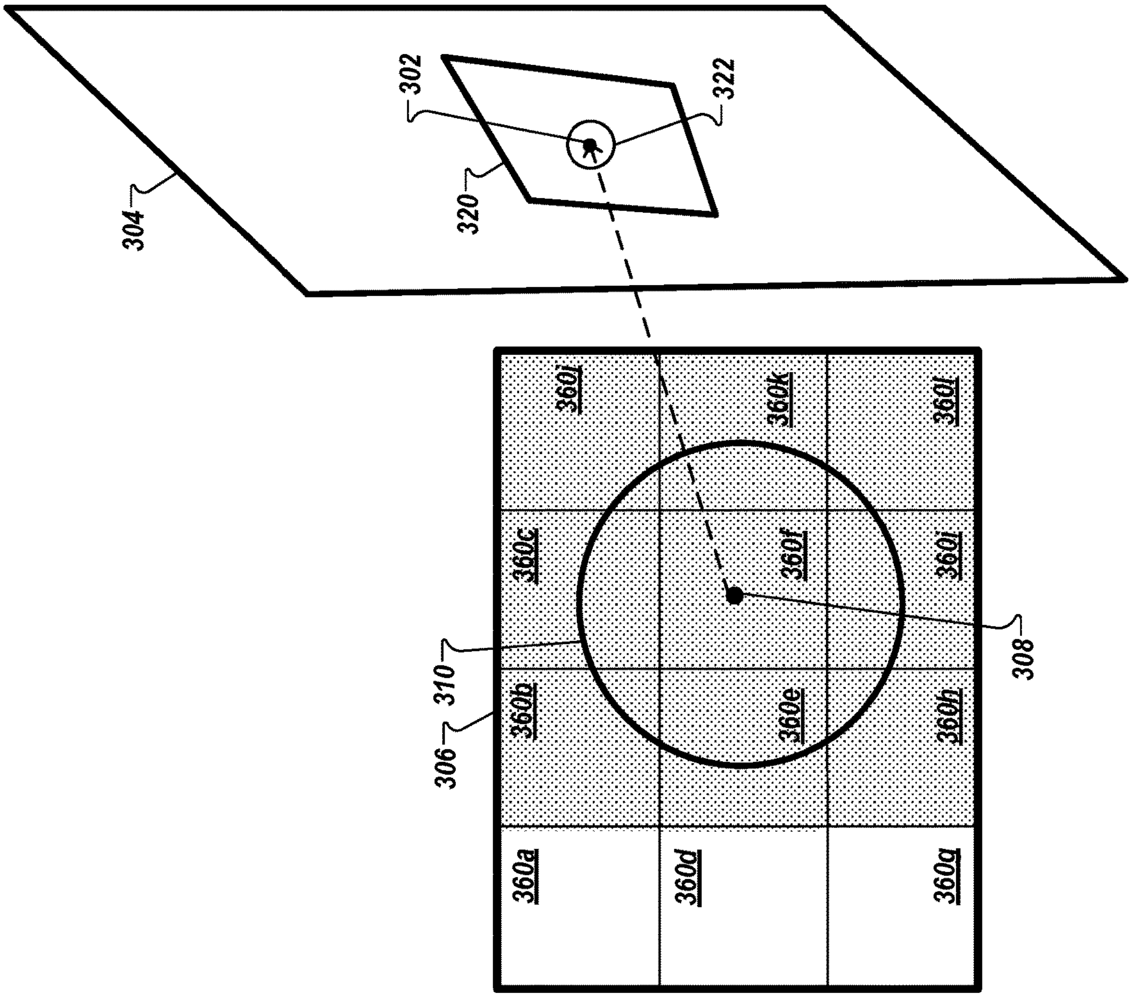

Each point included in a partition plane can be projected into a source camera window space. Referring to FIG. 3A, the source camera window space 306 can include a plurality of pixels (e.g., pixels 360*a*-1). When projected, a point (e.g., the point 302) is projected into at least one pixel (e.g., pixel 360*f*) included in the image plane of the source camera (the source camera window space 306) resulting in the projected point 308. A filter 310, which is of a particular size and shape (e.g., a circle with a particular radius as shown in the example of FIGS. 3A-B), is included in the source camera window space 306. The filter 310 places the projected point 308 at the center of the filter 310 (the filter 310 is placed around the projected point 308). The filter 310 can define a shape that can overlap, either fully or partially, pixels included in the source camera window space 306. In the example shown in FIG. 3A, the filter 310 overlaps either fully or partially the shaded pixels (e.g., pixels 360*b*-*c*, pixels 360*e*-*f*, and pixels 360*h*-1) that include the pixel 360*f* that includes the projected point 308. The shape of the filter 310 can also define a size for the projected point 302 in the source camera window space 306.

Referring to FIGS. 3A-B, the projected point 308 when projected back into the partition plane 304 results in a surfel 322 at the location of the point 302 in the partition plane 304. For example, a plurality of rays (e.g., rays 310*a*-*d*) can be drawn from the corners of the pixels included in (overlapped by) the filter 310 to the partition plane 304. The intersection of the rays with the partition plane 304 can define a surfel footprint 320 for the surfel 322. In addition, surfels can be drawn as a mathematical function of a circle. Surfels can be approximated by a polygon and rasterized. Surfels can be simplified to a front-facing rectangle and drawn as uniform depth. The circular shaped filter (e.g., the filter 310) can define a size of the point 302 in the image plane of the source camera (e.g., the source camera window space 306). The filter 310 (e.g., the circle with a particular radius as shown in the example of FIGS. 3A-B) along with the projected point 308 can be projected back into the partition plane 304. The projected point 308 when projected back into the partition plane 304 results in, for the example shown in FIGS. 3A-C, a quadrilateral surfel footprint (e.g., the surfel footprint 320) which defines the point 302 in the partition plane 304. In addition, the surfel footprint 320 provides (defines) a size for the point 302 in the partition plane 304. The surfel footprint 320 is a 3D shape for the surfel 322.

The pixel 360*f* in the source camera window space 306 defined by the filter 310 and including the projected point 308 is projected back into the partition plane 304 resulting in a surfel 322. The texture rasterizer performing the projecting of the point 302 from the partition plane 304 into a pixel (e.g., pixel **360*f*) as defined by the filter in the source camera window space 306 and then projecting the pixel (e.g., pixel 360*f*) back into the partition plane 304 results in the point 302 being turned into the surfel 322 with an associated color based on the color of the pixel. A size associated with the filter 310** can determine a size for a surfel footprint. In some implementations, a size for a surfel footprint can be approximately the same for each surfel footprint. In addition or in the alternative, a location of the source camera relative to the partition plane can also contribute to the determination of a size for a surfel footprint.

A pixel that is projected into a partition plane that is from a first source camera will result in a surfel footprint that is larger than a surfel footprint that results from a pixel projected into the partition plane from a second source camera when the location of the first source camera is closer to the partition plane than the location of the second source camera. A best source camera can be selected for each surfel. Therefore, each surfel may be associated with a different source camera.

As described, the partition plane 304 can include a subset of the plurality of pixel samples or points that represent the scene image. Projecting multiple points included in the partition plane 304 into the source camera window space 306 and then back into the partition plane 304 can result in the partition plane 304 including multiple surfels with varying surfel footprints.

Each surfel included in a partition plane has an associated color. The color associated with a surfel can be the color of the projected pixel from the source camera. For example, the color associated with the surfel 322 can be the color of the pixel **360*f*** Creating a texture map for the surfels included in a partition plane provides the color needed for rendering (drawing) the partition plane in a scene in real time in 3D in an AR space.

In general, a partition plane can be input to the texture rasterizer. The texture rasterizer can produce and output a texture map and a matrix for the partition plane. The output texture map can include RGBA textures. The matrix can transform coordinates for the points from a world or camera space, using a view matrix, to an eye space (a view space). The eye space allows each coordinate to be seen from a camera or viewer's point of view. A partition plane can include a plane and a vector of surfels in an LDI eye-space.

Figure 3C:
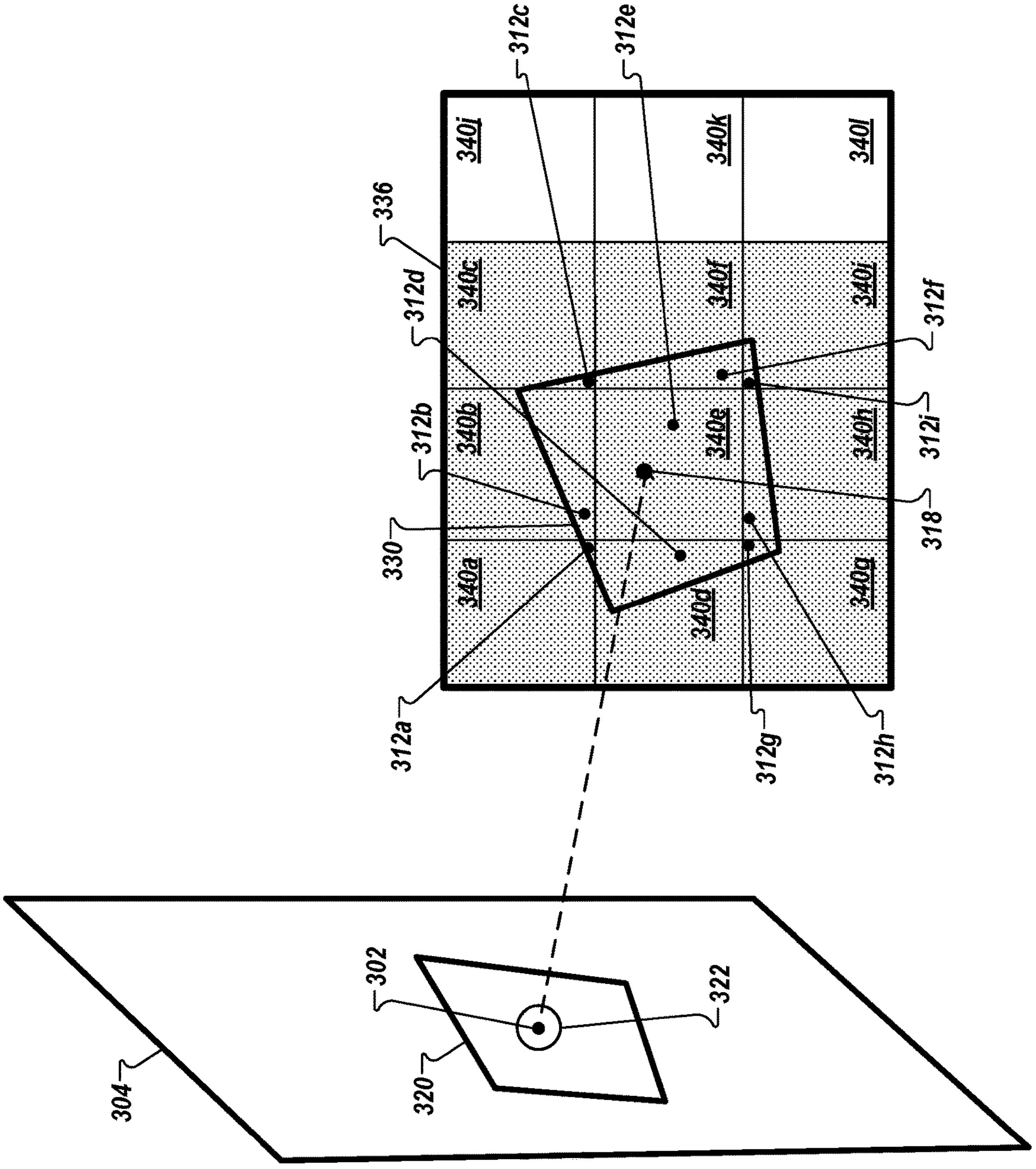

The texture rasterizer can define a target camera. In some implementations, the target camera can be the same as the source camera. In some cases, the target camera may be a different camera than the source camera. Referring to FIG. 3C, the surfels included in the partition plane (e.g., surfel 322 included in the partition plane 304) can be projected into a target camera window space (e.g., the target camera window space 336). The projection of the surfel 322 includes projecting the point 302 (projected point 318) into a pixel **340*e* and projecting the surfel footprint 320 (projected surfel footprint 330**).

The texture rasterizer can define a texture map (an image of the texture) as pixels in the target camera window space 336. Projecting the partition plane 304 into the target camera window space 336 results in, for the surfel 322, a surfel footprint 330 that includes the pixel samples or points **312*a-e*. The texture rasterizer can use the points 312*a-e* included in the surfel footprint 330 to determine a color value for the surfel because the points 312*a-e* define a texture for the partition plane 304**.

The target camera window space can be an image plane. The image plane can include pixels **340*a*-1. The image plane of the target camera has an associated resolution based on the number of included pixels. For example, as shown in FIGS. 3A-C, the resolution of the image plane of the target camera (the target camera window space 336) is the same as the resolution of the image plane of the source camera (the source camera window space 306**). In some implementations, the resolution of the image plane of the target camera can be different than the resolution of the image plane of the source camera.

The target camera window space 336 can include a plurality of pixels **340*a*-1. The projected surfel footprint 330 can include (cover) the pixels 340*a-i* included in the target camera window space 336. Referring to FIG. 3C, the pixels 340*a-i* included (covered) by the surfel footprint 330 are shown as shaded. The pixels 340*a-i* that are covered by (overlap with) the projected surfel footprint 330 can be filled (colored in) with the color associated with the surfel 322. The pixels 340*a-i* can define a texture (a texture map) for the surfel 322**.

The projected surfel footprint 330 can be filled with the color of the projected surfel 332. In some implementations, one or more pixels that are partially included in (overlapped by) the projected surfel footprint 330 can be filled with the color associated with the projected surfel 332. For example, pixels **340*a-d* and pixels 340*f-i* are partially covered by the projected surfel footprint 330**.

Nine pixels (e.g., pixels **340*a-i*) are shown as included in (overlapped by) the projected surfel footprint 330. In some implementations, less than nine pixels may be included in (overlapped by) the projected surfel footprint 330. In some implementations, more than nine pixels may be included in (overlapped by) the projected surfel footprint 330. For example, the number of pixels that may be included in (overlapped by) the projected surfel footprint 330 can be in the order of one to nine pixels. However, the projected surfel footprint 330** can be as large as the entire image.

Figure 3D:
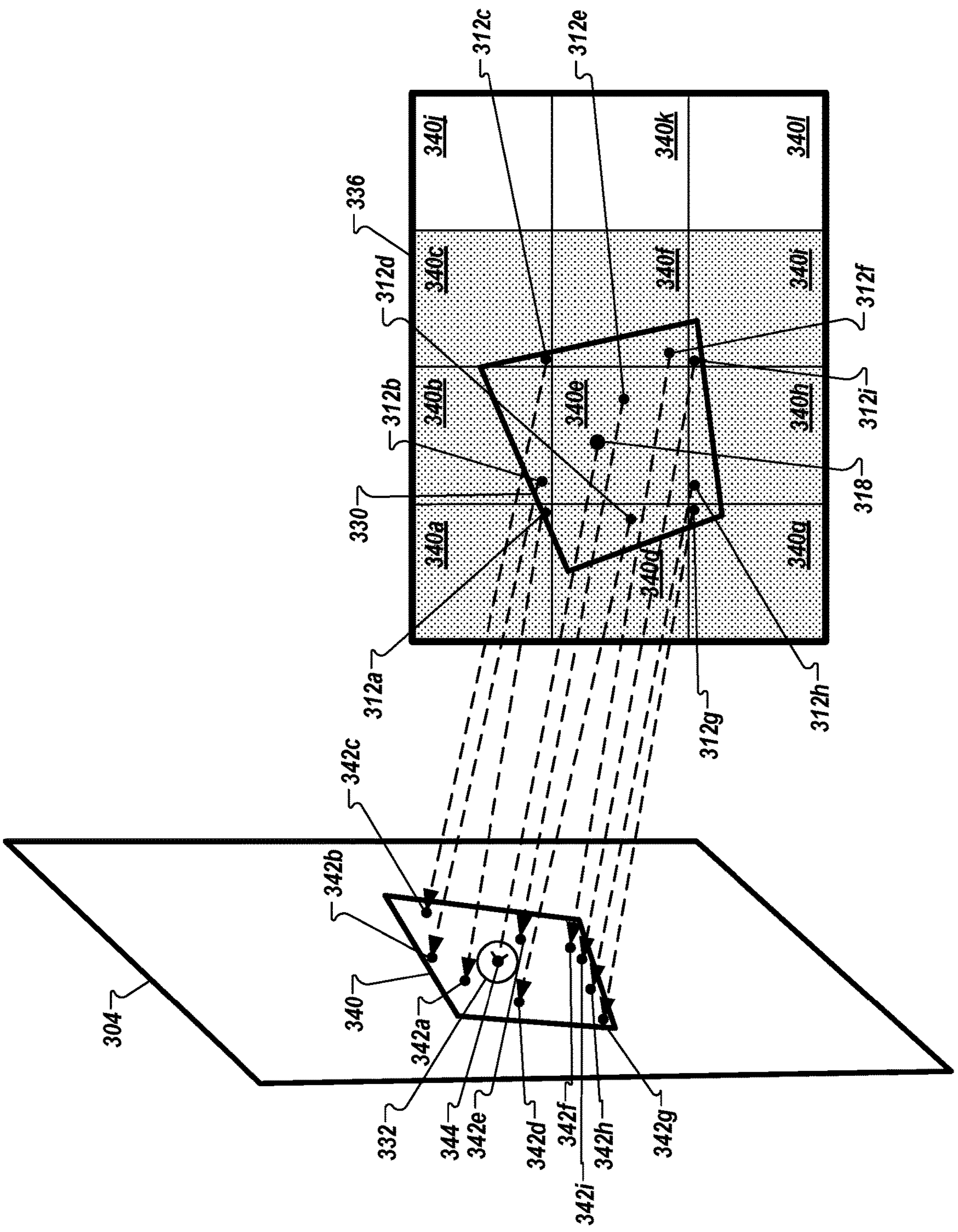

Referring to FIGS. 3C-D, a pixel can include a plurality of pixel samples or points. For illustration purposes, FIGS. 3C-D show points **312*a-i*, showing a pixel sample or point for each respective pixel 340*a-i* covered by the projected surfel footprint 330. Each pixel 340*a*-1 can include more than a single pixel sample. The points covered by the projected surfel footprint 330 (e.g., points 312*a-i*) can be projected back into the partition plane 304 resulting in a projected surfel footprint 340 that includes projected points (e.g., projected points 342*a-i*, respectively). The projection includes projecting the point 318 resulting in the projected point 344 in the projected surfel 332**.

The projected surfel footprint 340 shown in FIG. 3D is of the same size, the same shape, and is in the same location in the 3D space as the surfel footprint 320 as shown in FIG. 3C. The color associated with the color of the projected surfel 332 is the color associated with the surfel 322.

Figure 3E:
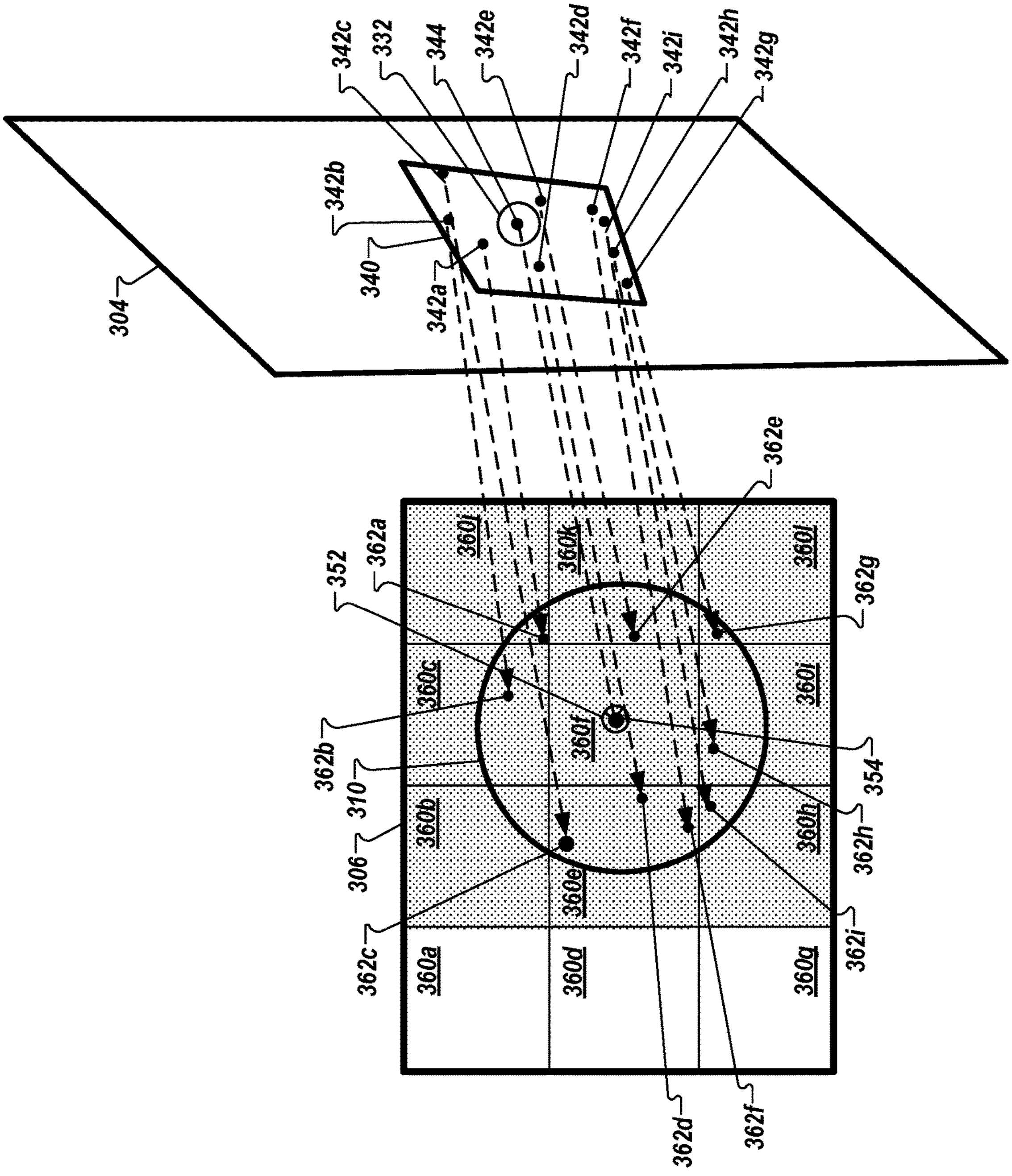

Referring to FIGS. 3C-E, each pixel sample or point included in a projected surfel footprint included in a partition plane can be projected back into a source camera window space. The projecting can identify a current location for the pixel sample or point in the source camera window space. For example, points **342*a-i* can be projected back into the source camera window space 306 as projected points 362*a-i*. For example, the projected point 362*a* identifies a location in the source camera window space 306 for the projected point 342*a*, which is the projection of the point 312*a* from the target camera window space 336. For example, the point 312*a* can be generated in the target camera window space 336 as a point included in the pixel 340*a***.

The filter 310 can have an associated function that provides each pixel sample or point included in (overlapped by) the filter 310 with a weight for a color of the point. The color weight for the point can be based on a distance of the point from the point located in the center of the filter 310 (e.g., a projected point 354). The point 354 and the surfel 332 when projected back into the source camera window space 306 can result in a surfel 352 whose center is the point 354.

Referring to FIGS. 3A-E, the partition plane 304 may include multiple surfels and associated surfel footprints. Each surfel and its associated footprint can be projected back into the source camera window space 306 and the filter 310 can be applied. In some cases, one surfel footprint may overlap an adjacent surfel footprint. Having the function for the filter 310 be a bell curve ensures a smooth blending between adjacent surfels. The blending of the colors of neighboring surfels is improved.

A partition plane can include more than one surfel (e.g., two or more surfels). In some implementations, each surfel may be associated with a different source camera. In some implementations, each surfel may be associated with the same source camera. In some implementations, some surfels may be associated with a first source camera and other surfels may be associated with a second source camera. For example, the best source camera can be picked for a particular surfel.

A color for a point or pixel sample included in a surfel footprint (e.g., the surfel footprint 340) that is projected back into a source camera window space (e.g., the source camera window space 306) and included in a filter (e.g., the filter 310) can be determined (calculated) based on the color value for the surfel included in the center of the filter (e.g., the color of the surfel 332 which is the color of the surfel 352). An example calculation to determine a color for a pixel sample or point (Color (p1)) is shown by Equation 1.

$$\text{Color}(p1) = ((\text{surfel color value}) \times (\text{weight value}(p1))) \div \sum_{i=1}^{n} \text{weight}_i \quad \text{Equation 1}$$

Where p1 is the pixel sample or point, surfel color value is the color value of the surfel that is included in the same filter as the pixel sample or point, p1, weight value (p1) is the weight value for the pixel sample or point, p1, $$\sum_{i=1}^{n} \text{weight}_i$$

is the sum of all of the weights where n=total number of weights.

Surfel-based fusion for depth maps can take as input a sequence of depth images. A depth image can be an image where a pixel(s) represents a distance from the camera location. This input image(s) can be a sparse image. For example, a portion (some/most) of the input pixels can be blank and/or marked as invalid. Each depth pixel can have an associated confidence value (e.g., in the range of 0 to 1). Further, a depth image can have a corresponding luminance image, representing the same scene and camera elements (e.g., number of pixels, image length and width, and the like). In an example implementation, accumulated depth frames (e.g., as stored in buffer 110) can be used as input to 3D surfel generation.

In some implementations, the techniques described herein can be implemented in an application programming interface (API). Inclusion in an API can give these techniques access to additional data. For example, an estimated pose of each camera frame with respect to the world coordinates, can be determined based on a tracking provided by the API. The tracking can also be used in position determination, environmental light estimation, background and flat surface determination and/or the like. In other words, access to API data can help perform some of the techniques described herein.

In some implementations, a portion of the depth frames (e.g. every other, 1 of 3, 1 of 4, less than all, and/or the like). In other words, a lower frame rate (e.g., as compared to frames captured during an AR session as depth 215 and/or image 210) can be used for 3D surfel generation. In some implementations, the frames for 3D surfel generation can be stored in a second (not shown) buffer and/or in a portion of buffer 110). In some implementations, input frame(s) can be stored in the second buffer and can be used for input to surfel generation at a lower framerate. As a result, the data from a plurality of frames can be used, but the actual processing of the plurality of frames can be performed at a lower framerate.

FIGS. 4A, 4B, 4C and 4D pictorially illustrate accumulation of a geometry according to an example implementation. The geometry can be stored as a data structure (as discussed above). For example, the data structure can be an n-tuple. A surfel, and/or the like). In an example implementation, surfels can be generated from input depth by first estimating the normal orientation associated with each pixel in the input. Once there is a depth value and normal vector associated with each pixel, surfels can be generated by clustering these pixels and generating disks (as discussed above) represented in world coordinates. The size of these disks can be based on a number of neighboring pixels that share the same depth and orientation (and possibly color). These surfels can be stored across frames of the AR session, and as each new depth frame is integrated, the surfels can be updated and/or merged based on this new information. If new depth information disagrees with the previous surfel data (e.g. something moves in the scene), the original surfels can be penalized (e.g., decreased confidence), deleted, and/or replaced with new geometry.

Figure 4A:
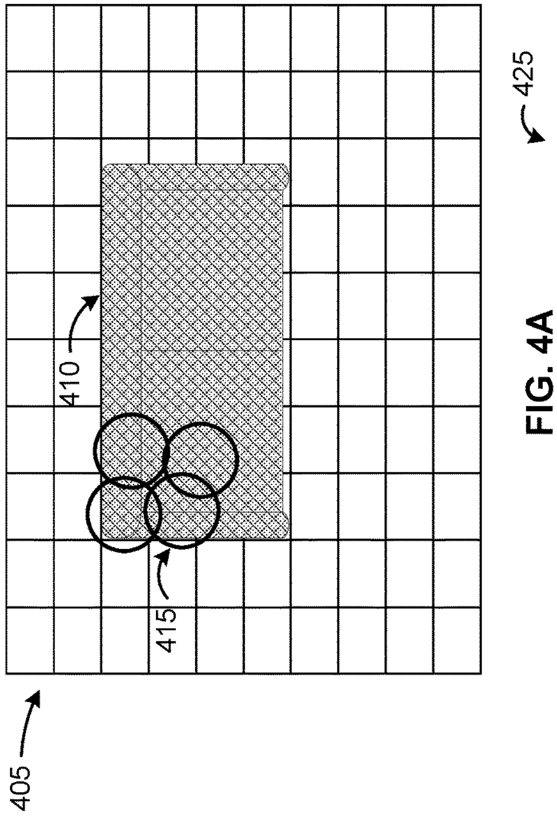
FIGS. 4A, 4B, 4C and 4D pictorially illustrate accumulation of a geometry according to an example implementation.

As shown in FIG. 4A, a grid 405 can represent a portion of a real-world geometry (or partition plane) as can be displayed on an AR display. On the grid 405 is a first object 410. Circles 415 are a pictorial representation of a data structure (e.g., a surfel footprint) that can include information about a portion of the grid 405 including the first object 410. In an example implementation, the data structure (or data structures, surfel(s), and/or the like) can be stored as stored geometry 220. Further, the data structure can include a confidence which can be stored as confidence 230).

Figure 4B:
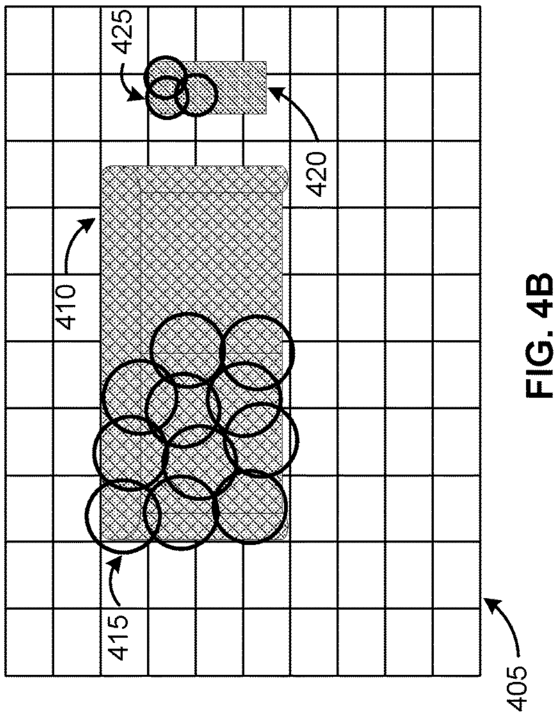

As shown in FIG. 4B, the circles 415 have increased in number and a second object 420 has been added to the grid 405. Circles 425 are a pictorial representation of a data structure (e.g., a surfel footprint) that can include information about a portion of the grid 405 including the second object 420. FIG. 4B can represent the grid 405 representing the portion of the real-world world captured at a different time (e.g., a later time) than FIG. 4A.

Figure 4C:
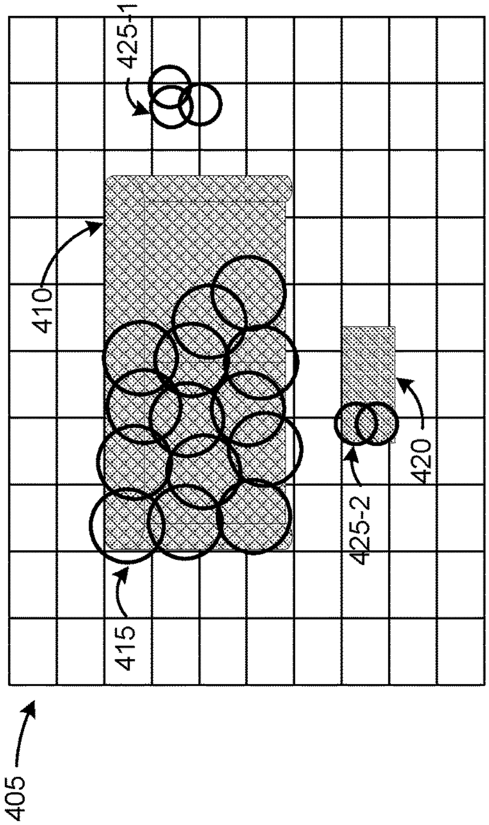

As shown in FIG. 4C, the circles 415 have increased in number and the second object 420 has been moved on the grid 405. Circles 425 are in two portions shown as circles 425-1 and 425-2 each associated with the second object 420 at different locations on the grid 405. The circles 425-1 can be penalized (e.g., decreased confidence) because the circles 425-1 indicate the 420 remains in the location in FIG. 4B when it is not. FIG. 4C can represent the grid 405 representing the portion of the real-world world captured at a different time (e.g., a later time) than FIG. 4B.

Figure 4D:
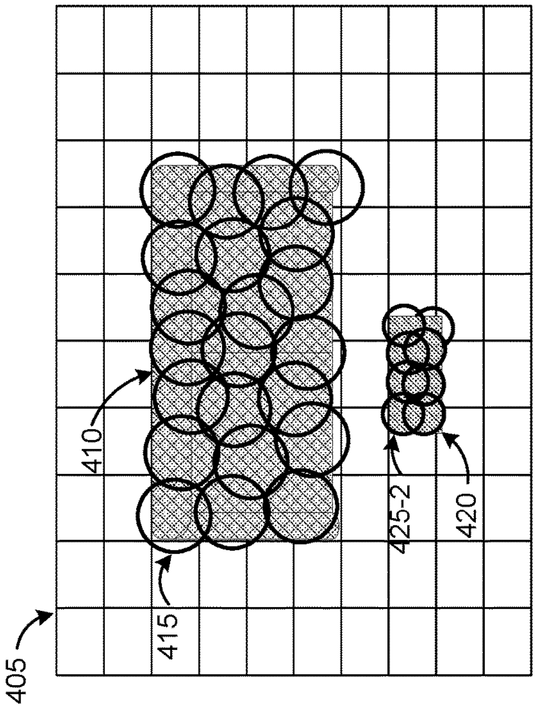

As shown in FIG. 4D, the circles 415 have increased in number, the circles 425-1 have been removed and the circles 425-2 have increased in number (and circles 425-2 can represent object 420). In FIG. 4D object 410 and object 420 can be completely represented (e.g., as a data structure(s) or surfel(s)). FIG. 4D can represent the grid 405 representing the portion of the real-world world captured at a different time (e.g., a later time) than FIG. 4C.

Figure 5:
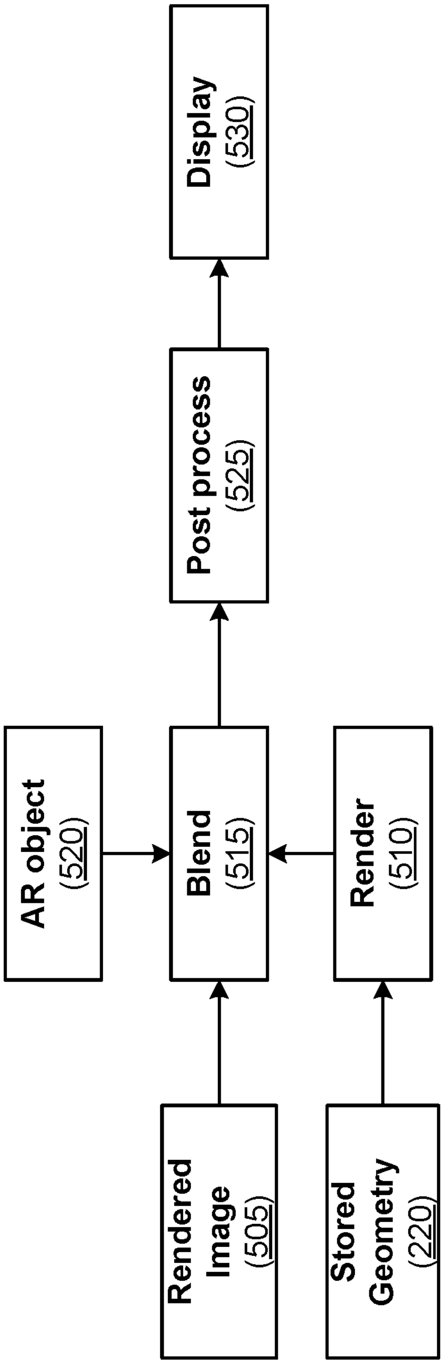
FIG. 5 illustrates a block diagram of a signal flow for generating an image for display according to an example implementation.

FIG. 5 illustrates a block diagram of a signal flow for generating an image for display according to an example implementation. As shown in FIG. 5, the signal flow includes a rendered image 505 block, the stored geometry 220 block, a render 510 block, a blend 515 block, an AR object 520 block, a post process 525 block, and a display 530 block. In an example implementation, stored geometry (e.g., representing a real-world space captured and stored over time) can be used to generate more complete depth data representing the depth of objects in the real-world space. As new frames are rendered stored geometry can be used to supplement (or blended with as represented by the blend 515 block) depth data associated with a current rendering of the real-world space. An AR object can be combined with the blended renderings to generate an image for display on a display of the AR system.

The rendered image 505 block can be a rendered depth image (e.g., based on the depth 215) and/or a rendered color image (e.g., based on the image 210). In other words, the rendered image 505 can include color information, depth information, direction information, layer information, object information, and/or the like. In some implementations, the depth information can be blank (e.g., incomplete or missing pixels) and/or marked invalid.

The render 510 block can be the rendering of an image retrieved from the stored geometry 220 block. The stored geometry 220 block can represent a storage (e.g., memory) of a device (e.g., a mobile phone, a tablet, a headset, and/or the like) executing an AR application and/or a server having a memory accessible using the device executing the AR application. As is shown, the render 510 block can be read from the stored geometry 220 block. The render 510 block can include an image having depth information and/or color information. The depth information can include a depth map having a depth value for each pixel in an image. The depth information can include depth layers each having a number (e.g., an index or z-index) indicating a layer order. The depth information can be a layered depth image (LDI) having multiple ordered depths for each pixel in an image. Color information can be color (e.g., RGB, YUV, and/or the like) for each pixel in an image.

In an example implementation, the stored geometry 220 block can include a data structure(s) including a surfel(s). Therefore, the render 510 block can use a projection technique. The projection technique can include point based rendering or splatting. Point based rendering or splatting can include assigning variables to pixels in a pixel space. The variables can include color, texture, depth, direction and/or the like. The variables can be read from at least one surfel (e.g., based on a position of the surfel and the pixel).

The blend 515 block is configured to blend the rendered image 505 with the render 510 of the stored geometry 220. Blending the rendered image 505 with the render 510 of the stored geometry 220 can generate a representation of the real-world or a real-world image. Blending two or more images can include combining portions of each image. For example, data (e.g., depth data, color data, pixels, and/or the like) that is missing from the rendered image 505 block can be filled in using data from the render 510 of the stored geometry 220. For example, pixels having the same position and/or same position and same depth can be combined. The position can be based on a distance and direction from the point of reference (or home position). The position can be based on a coordinate system (e.g., x, y grid).

As mentioned above, a portion of the pixels in a depth image can be blank or marked as invalid. Therefore, in an example implementation, a pixel (e.g., having depth) that is missing or marked as invalid (e.g., missing depth information or invalid depth information) in the rendered image 505 can be filled in with a pixel (e.g., the depth information) from the render 510 of the stored geometry 220 having the same position and layer as the missing or invalid pixel. In an example implementation, a pixel from the rendered image 505 and the render 510 of the stored geometry 220 have the same position and are at a layer having the same index value. Blending the two images can include selecting the pixel from the render 510 of the stored geometry 220 and discarding the pixel from the rendered image 105.

Alternatively, blending the two images can include selecting the pixel from the rendered image 105 and discarding the pixel from the render 510 of the stored geometry 220. Alternatively, blending the two images can include averaging the color and assigning the averaged color to the position and the layer. Other techniques for blending two images are within the scope of this disclosure.

Further, prior to blending, images can be projected into each other. For example, images can be captured while the mobile device is moving. A previous frame (e.g., as stored in a buffer and/or generated in the render 510 block) can be reprojected into a current frame (e.g., rendered image 505). This implementation can enable (or help enable) aligning objects and/or observed features across frames.

The blend 515 block can also combine the AR object 520 into the real-world image. The AR object can be an image generated by the AR application for placement (by the AR application) into the real-world space. As mentioned above, blending and/or combining two or more images can include combining portions of each image. In an example implementation, combining the AR object 520 into the real-world image can include occlusion based on depth. For example, if a portion of the AR object 520 is at a depth (e.g., a layer) that is in front of a portion of real-world object, the portion of the real-world object can be removed from the combined image. Further, if a portion of the AR object 520 is at a depth (e.g., a layer) that is behind a portion of real-world object, the portion of the AR object 520 can be removed from the combined image. An advantage of using the stored geometry 220 is that if the real-world image includes depth information that is blank or marked as invalid at the position of the portion of the AR object 520, the depth information of the stored geometry 220 can be used in place of the blank or invalid depth information. Accordingly, the occlusion based on depth can be more accurate using the stored geometry 220.

The post processing 525 block can improve a quality of the resultant image or frame. The display 530 block is configured to display the resultant post-processed blended and/or combined image. For example, the resultant image or frame can be filtered to smooth transitions between colors or sharpen transitions between colors. The resultant image or frame can be filtered to remove artifacts (e.g., errors including color or depth that likely does not belong in the image. The resultant image or frame can be filtered to remove AR and real-world discontinuities (e.g., AR elements that should be blocked by real-world elements).

In an example implementation, the stored geometry 220 can be used without the rendered image 505. In other words, the real-world space can be a stored real-world space. Therefore, the stored geometry 220 can be a complete (or significantly complete) representation of a real-world space. In this implementation, the AR object 520 is combined with a rendered stored real-world.

In some implementations, the techniques described herein can be implemented in an application programming interface (API). The API can be an element of a developers toolkit. Including these techniques in an API accessible by developers can enable many use cases. For example, the real-world space can represent a living space (e.g., a living room, a dining room, and/or the like). The AR object 520 can be of a furniture object (e.g., a couch, a chair, a table, and/or the like). A user of the AR application can place the furniture object in the living space as desired. In a further implementation, the AR application can be configured to remove objects in the real-world space. For example, an existing piece of furniture can be removed and replaced by an AR image of another piece of furniture. As mentioned above, the stored geometry 220 can include a surfel(s). In this implementation a portion of the surfel(s) can be removed (e.g., deleted from stored geometry 220 or prevented from rendering by the render 510 block).

Figure 6:
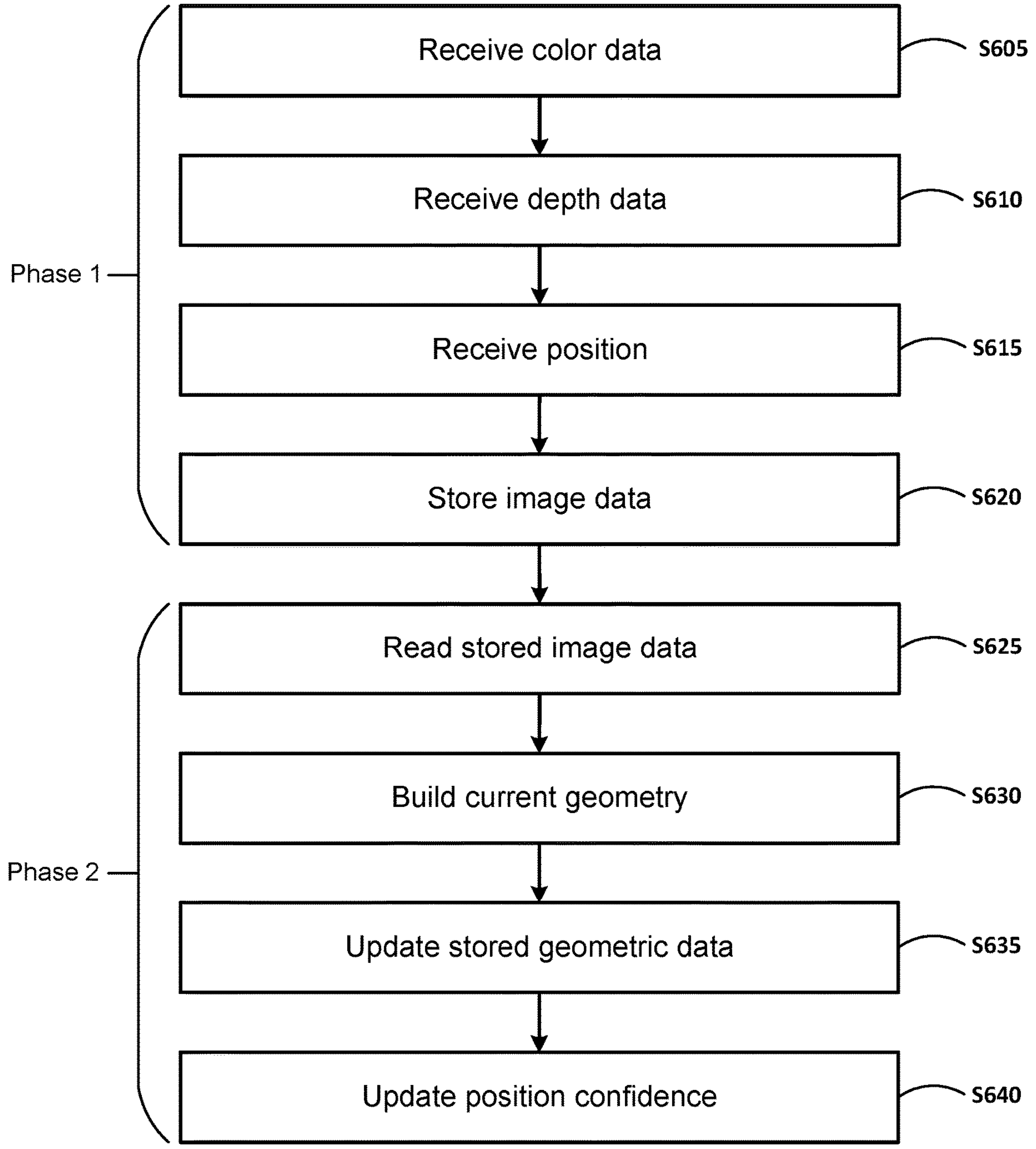
FIG. 6 illustrates a method for storing a geometry according to an example implementation.
Figure 7:
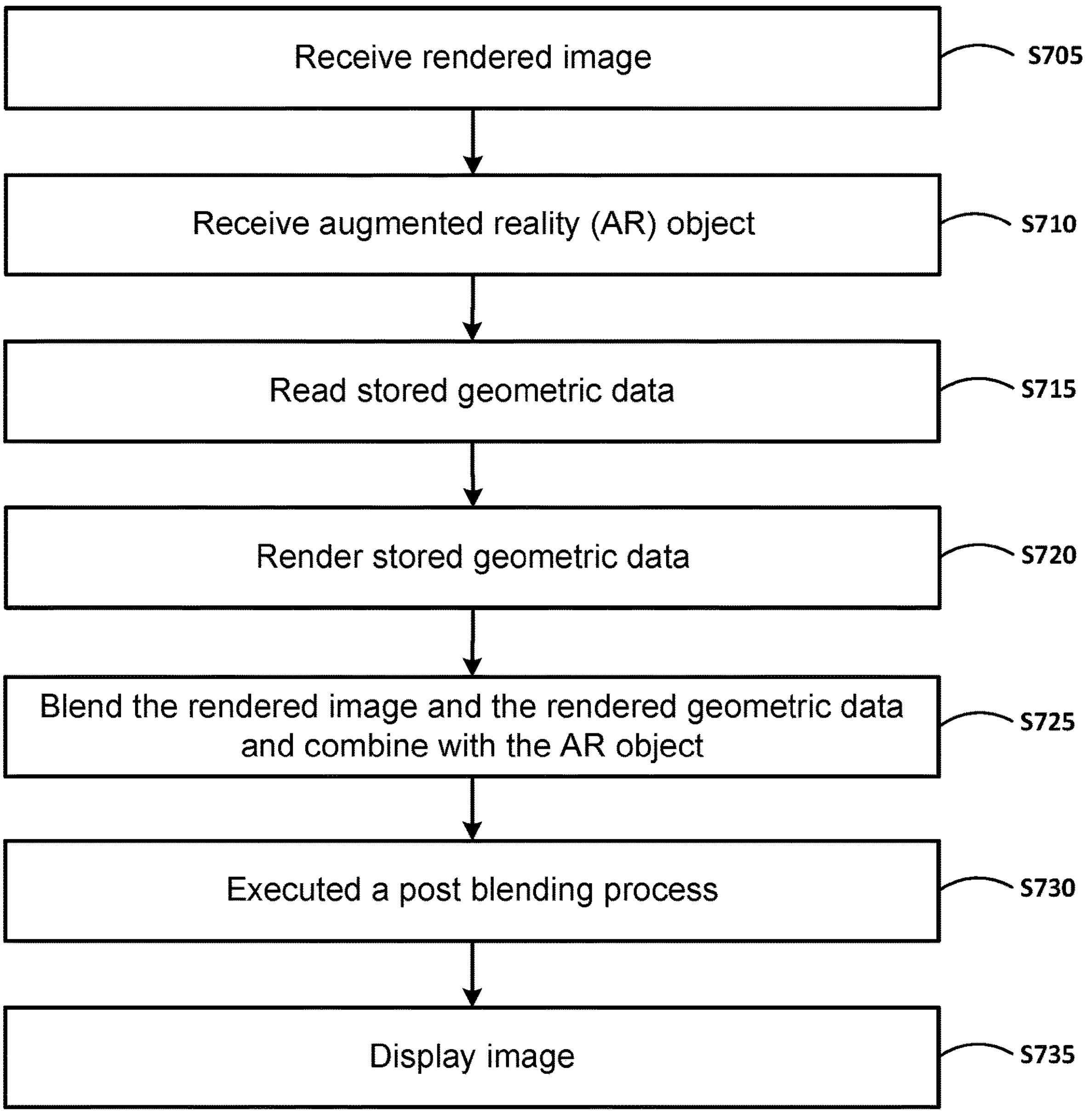
FIG. 7 illustrates a method for generating an image according to an example implementation.

FIGS. 6 and 7 are flowcharts of methods according to example embodiments. The methods described with regard to FIGS. 6 and 7 may be performed due to the execution of software code stored in a memory (e.g., a non-transitory computer readable storage medium) associated with an apparatus and executed by at least one processor associated with the apparatus.

However, alternative embodiments are contemplated such as a system embodied as a special purpose processor. The special purpose processor can be a graphics processing unit (GPU). A GPU can be a component of a graphics card. The graphics card can also include video memory, random access memory digital-to-analogue converter (RAMDAC) and driver software. The video memory can be a frame buffer that stores digital data representing an image, a frame of a video, an object of an image, or scene of a frame. A RAMDAC can be configured to read the contents of the video memory, convert the content into an analogue RGB signal and send analog signals to a display or monitor. The driver software can be the software code stored in the memory referred to above. The software code can be configured to implement the method described herein.

Although the methods described below are described as being executed by a processor and/or a special purpose processor, the methods are not necessarily executed by the same processor. In other words, at least one processor and/or at least one special purpose processor may execute the method described below with regard to FIGS. 6 and 7.

FIG. 6 illustrates a method for storing a geometry according to an example implementation. As shown in step S605, color data is received. For example, an AR application can be operating. The AR application can be operating on a computing device (e.g., a mobile phone, a tablet, a headset, and/or the like) including a camera. The color data can be captured and communicated by the camera. Step S605 begins a first phase of a two phase technique.

In step S610 depth data is received. For example, the camera can include the functionality to capture depth data. In other words, the camera can capture color data (e.g., RGB) and depth (D) data. The camera can be an RGBD camera. Alternatively, or in addition to, the AR application may be configured to generate depth data from color data. As mentioned above, the depth data can include pixels that are blank (e.g., incomplete or missing pixels) and/or marked invalid.

In step S615 a position is received. For example, the AR application can be configured to determine a position of the computing device in a real-world space. The position can be based on a distance and direction from a point of reference (or home position). The position can be based on a coordinate system (e.g., x, y grid). The position can also include depth (e.g., distance from an object). The AR application can be configured to generate the reference during an initialization of the AR application. The reference can be a location in the real-world space and/or a global point of reference (e.g., from a global positioning sensor).

In step S620 image data is stored. For example, image data based on the color data and depth data is stored. The image data can be, pixels, point (or point cloud) data, polygon (e.g., triangles) data, mesh data, surfel(s), and or the like. As mentioned above, the depth data can include pixels that are blank (e.g., incomplete or missing pixels) and/or marked invalid. Therefore, the image data can have missing or invalid depth information. As mentioned above, the image data can be stored in a buffer (e.g., buffer 110). In this first phase, this image data can be re-projected (e.g., rendered) and blended with current data (e.g., as captured by the camera) and combined with an AR object for display by the AR application.

In step S625 stored image data is read. For example, the previously stored image data can be read. The stored image data can be read from a buffer (e.g., buffer 110). In an example implementation, the stored image data includes a plurality of frames as captured by the camera of the device executing the AR application. Further, a portion of the plurality of frames can be read (e.g. every other frame, 1 of 3 frames, 1 of 4 frames, less than all, and/or the like). Step S625 begins a second phase of a two-phase technique.

In step S630 a current geometry is built. For example, a data structure (e.g., a n-tuple, a tree, and/or the like) representing a real-world geometry (e.g., a geometry of the real-world space) associated with the AR application or system can be built. The data structure can include a geometry for a position (e.g., for an object at a position). The data structure can include color information, texture information, depth information, position information, and direction information. The depth information can include depth layers each having a number (e.g., an index or z-index) indicating a layer order. The depth information can be a layered depth image (LDI) having multiple ordered depths for each pixel in an image. The depth information can include depth map. Texture information, depth information, position information, and direction information can be elements of a geometric object having connectivity (e.g., a mesh of polygons). Texture information, depth information, position information, and direction information can be elements of a geometric object without connectivity (e.g., a surface element or surfel).

In step S635 the stored geometric data is updated. For example, the geometry can be added to an existing data structure (e.g., the stored geometry 220). Updating stored data can include adding to the stored geometric data, revising the stored geometric data, replacing a portion of the stored geometric data, and/or deleting a portion of the stored geometric data. As mentioned above, the geometric data can be surfel(s). Therefore, updating the stored geometric data can include adding surfel(s), revising surfel(s), replacing surfel(s), and/or deleting surfel(s). Over time (e.g., as the data structure becomes a complete representation of the real-world space), the stored geometry can be used to generate images (e.g., frames) in the AR application in place of the stored image data. In other words, the stored geometric data (or a portion thereof) can be rendered and blended with the current data (e.g., as captured by the camera) and combined with an AR object for display by the AR application. In some implementations, the stored geometric data (or a portion thereof) can be rendered and combined with the AR object (without the current data) for display by the AR application.

In step S640 a position confidence is updated. For example, the confidence can be a numeric value in a range (e.g., 0-1). A larger (or smaller) numeric value can indicate high confidence and a smaller (or larger) numeric value can indicate low confidence. For example, a confidence of 1 can be a high confidence and a confidence of 0 can be a low confidence. The confidence can indicate how likely the data structure (or a portion of the data structure) represents the real-world space.

For example, if an object in the real-world space repeatedly appears at a location and depth, a data structure representing the object in the real-world space may have an associated high (e.g., a numeric value approaching 1) confidence. In an example implementation, a surfel(s) representing the object may have an associated high (e.g., a numeric value approaching 1) confidence. If an object in the real-world space appears in a first location and depth in a first frame and a second location and depth in a second frame, a data structure representing the object in the real-world space may have an associated low (e.g., a numeric value approaching 0) confidence. In an example implementation, a surfel(s) representing the object may have an associated low (e.g., a numeric value approaching 0) confidence. As described above, a data structure representing an object that has moved in the real-world space may eventually be deleted at the position and depth in the data structure. As mentioned above, the real-world space may be represented by a plurality of data structures (e.g., surfels).

There are a number of use-cases for these surfels, including object scanning, room reconstruction, physics collisions, free space detection, path planning, etc. Additionally, one of our core use-cases is to feed the surfel data back into the final output depth map.

FIG. 7 illustrates a method for generating an image according to an example implementation. As shown in step S705, a rendered image is received. For example, an AR application can be operating. The AR application can be operating on a computing device (e.g., a mobile phone, a tablet, a headset, and/or the like) including a camera. The image (or a frame of video) can be received from the camera. The received image (or frame of video) can be rendered.

In step S710 an augmented reality (AR) object is received. For example, the AR object can be an object generated by the AR application for placement (by the AR application) into the real-world space. Therefore, the AR object can be received from an element of the AR application configured to generate the AR object. The AR object can include color information, depth information, direction information position information, and/or the like.

In step S715 stored geometric data is received. For example, the geometric data can be stored on the computing device. For example, the geometric data can be stored on a server. For example, the geometric data can be stored on a cloud (or remote) memory device. Accordingly, the geometric data can be received from the computing device, the server and/or the cloud memory. The geometric data can be received via a wired or wireless communication.

In step S720 the stored geometric data is rendered. For example, the geometric data is rendered as an image. Rendering the geometric data can generate, at least a portion, of an image representing a real-world space. The rendering can use a projection technique. The projection technique can include point-based rendering or splatting. Point based rendering or splatting can include assigning variables to pixels in a pixel space. The variables can include color, texture, depth, direction and/or the like. The variables can be read from at least one surfel (e.g., based on a position of the surfel and the pixel).

In step S725 the rendered image and rendered geometric data is blended and combined with the AR object. For example, the rendered image and the rendered geometric data can be blended. Then the AR object can be combined with the resultant image. Blending the rendered image with the render of the stored geometry can generate a representation of the real-world or a real-world image. Blending two or more images can include combining portions of each image (described in more detail above).

As mentioned above, a portion of the pixels in a depth image can be blank or marked as invalid. Therefore, in an example implementation, a pixel (e.g., having depth) that is missing or marked as invalid (e.g., missing depth information or invalid depth information) in the rendered image can be filled in with a pixel (e.g., the depth information) from the render of the stored geometric data having the same position and layer as the missing or invalid pixel.

In an example implementation, combining the AR object into the real-world image can include occlusion based on depth. For example, if a portion of the AR object is at a depth (e.g., a layer) that is in front of a portion of real-world object, the portion of the real-world object can be removed from the combined image. Further, if a portion of the AR object is at a depth (e.g., a layer) that is behind a portion of real-world object, the portion of the AR object can be removed from the combined image. An advantage of using the stored geometric data is that if the real-world image includes depth information that is blank or marked as invalid at the position of the portion of the AR object, the depth information of the stored geometric data can be used in place of the blank or invalid depth information. Accordingly, the occlusion based on depth can be more accurate using the stored geometric data.

In step S730 a post blending process is executed. For example, the post blending process can improve a quality of the resultant image or frame. The resultant image or frame can be filtered to smooth transitions between colors or sharpen transitions between colors. The resultant image or frame can be filtered to remove artifacts (e.g., errors including color or depth that likely does not belong in the image. The resultant image or frame can be filtered to remove AR and real-world discontinuities (e.g., AR elements that should be blocked by real-world elements). In step S735 an image is displayed. For example, the resultant post-processed blended image can be displayed.

Figure 8:
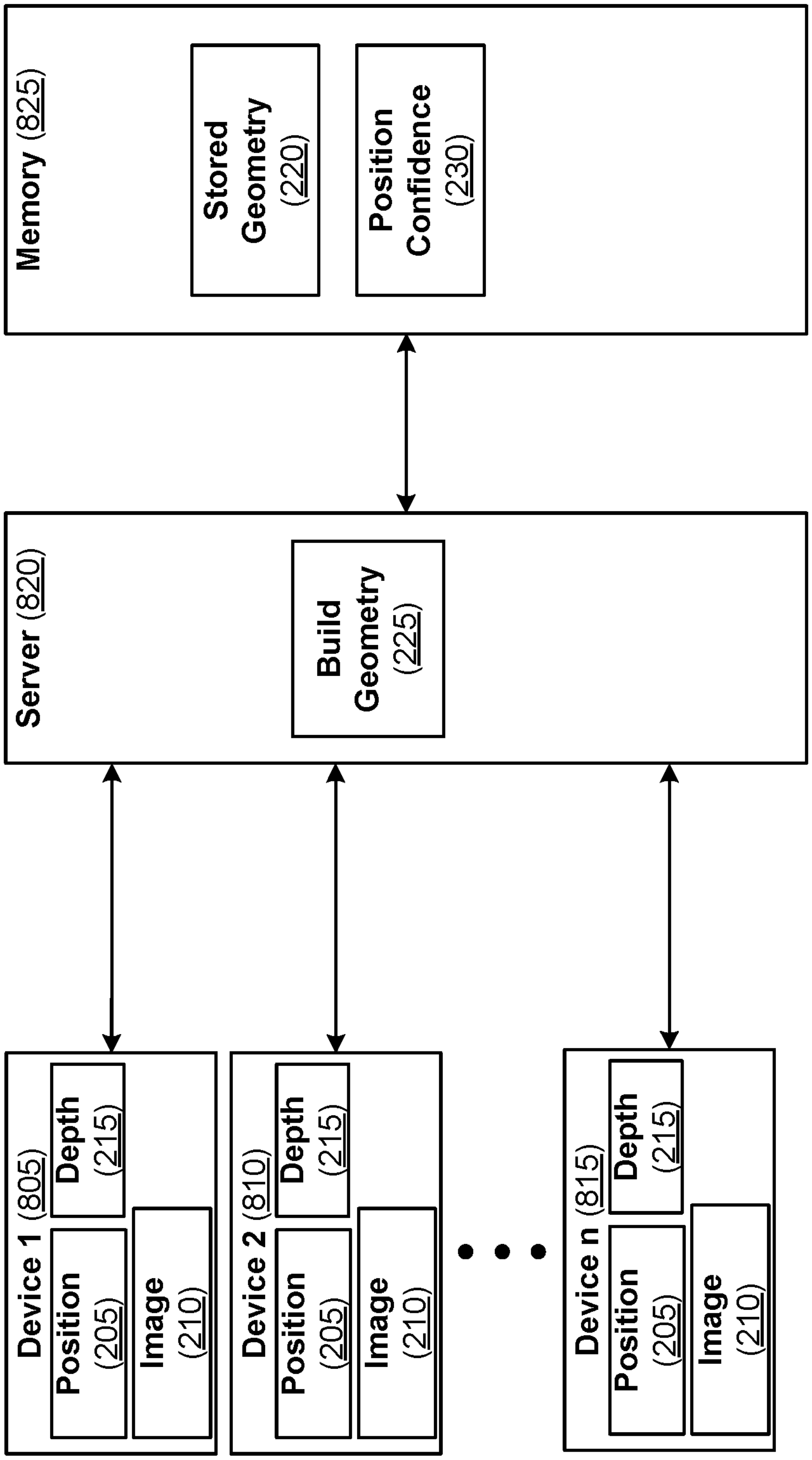
FIG. 8 illustrates a block diagram of a signal flow for storing a multidevice geometry according to an example implementation.

FIG. 8 illustrates a block diagram of a system for storing a multidevice geometry according to an example implementation. As shown in FIG. 8, the system includes a device 1 805, a device 2 810, a device n 815, a server 820 and a memory 825. The device 1 805 includes the position 205 block, the image 210 block, and the depth 215 block. The device 2 810 includes the position 205 block, the image 210 block, and the depth 215 block. The device n 825 includes the position 205 block, the image 210 block, and the depth 215 block. The server 820 includes the build geometry 225 block. The memory 825 includes the stored geometry 220 block and the position confidence 230 block.

In the example implementation of FIG. 8, a plurality of devices (e.g., device 1 805, device 2, 810, . . . , device n) operate together in an AR environment. The server receives image, depth and position data from each of the plurality of devices. The build geometry 225 block can use the image, depth and position data from each of the plurality of devices to generate the geometric data. The server 820 can store the geometric data and the confidence in stored geometry 220 block and position confidence 230 block of memory 825. Although memory 825 is shown separate from the server 820, the memory 825 can be included in server 820.

The plurality of devices can include buffer 110 and communicate a portion of the frames stored in buffer 110 to the server 820. The server 820 can communicate the stored geometry (e.g., as a surfel(s)) to the plurality of devices. Accordingly, each of the plurality of devices can utilize a more complete real-world space in the AR application as compared to a real-world space that is individual device generated. In other words, each of the plurality of devices can utilize portion(s) of the real-world space that had not been viewed by the individual device. In the implementation of FIG. 8, each of the plurality of devices is configured to project (e.g., render) and blend images.

Figure 9:
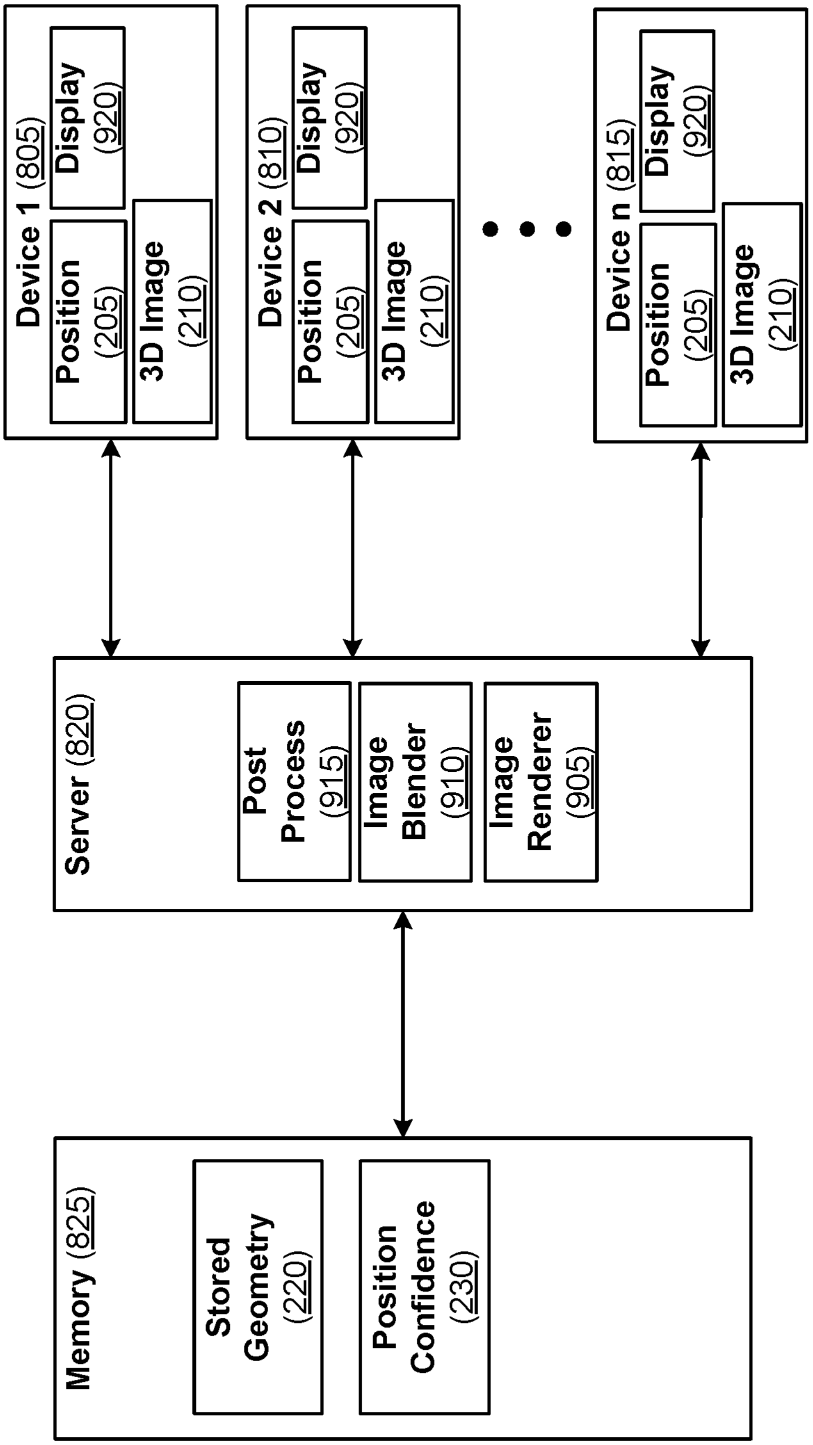
FIG. 9 illustrates a block diagram of a signal flow for a multidevice augmented reality system according to an example implementation.

FIG. 9 illustrates a block diagram of a system for a multidevice augmented reality system according to an example implementation. As shown in FIG. 9, the system includes the device 1 805, the device 2 810, the device n 815, the server 820 and the memory 825. The device 1 805 includes the position 205 block, the image 210 block, and a display 920 block. The device 2 810 includes the position 205 block, the image 210 block, and a display 920 block. The device n 815 includes the position 205 block, the image 210 block, and a display 920 block. The memory 825 includes the stored geometry 220 block and the position confidence 230 block.

In the implementation of FIG. 9, the plurality of devices are configured to receive projected (e.g., rendered) and blended images from the server 920. The rendered and blended images represent the real-world space (e.g., real-world space 100). Therefore, the server 820 includes a post blender 915 block, an image blender 910 block and an image renderer 905 block. However, each of the plurality of devices is configured to combine an AR object with the rendering of the real-world space.

Figure 10:
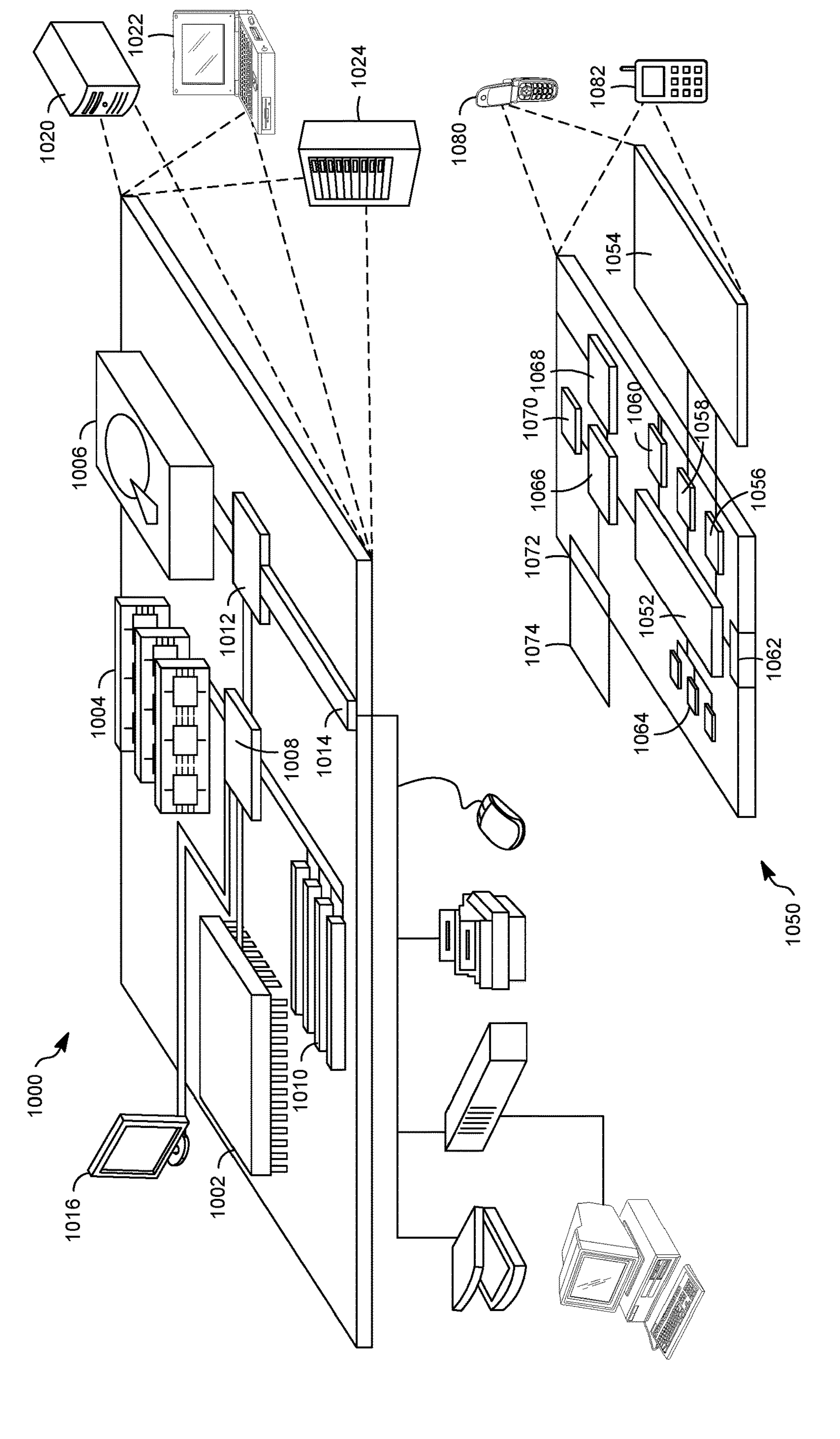
FIG. 10 shows an example of a computer device and a mobile computer device according to at least one example embodiment.

FIG. 10 shows an example of a computer device 1000 and a mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

In a general aspect, an apparatus, including one or more processors, and a memory storing instructions, a device, a system, a non-transitory computer-readable medium (having stored thereon computer executable program code which can be executed on a computer system), and/or a method can perform a process with a method including receiving a first depth image associated with a first frame at a first time of an augmented reality (AR) application, the first depth image representing at least a first portion of a real-world space storing the first depth image receiving a second depth image associated with a second frame at a second time, after the first time, of the AR application, the second depth image representing at least a second portion of the real-world space generating a real-world image by blending, at least, the stored first depth image with the second depth image receiving a rendered AR object combining the AR object in the real-world image and displaying the real-world image combined with the AR object.

Implementations can include one or more of the following features. For example, the first depth image can be one of a plurality of depth images representing frames of the AR application stored in a buffer associated with the AR application. The first depth image can be one of a plurality of depth images representing frames of the AR application stored in a buffer associated with the AR application, the method can further include selecting a portion of the plurality of depth images stored in the buffer generating a data structure based on the portion of the plurality of depth images, the data structure representing the real-world space, the data structure including depth information, position information, and direction information and storing the generated data structure. The first depth image can be one of a plurality of depth images representing frames of the AR application stored in a buffer associated with the AR application, the method can further include receiving a portion of the plurality of depth images stored in the buffer generating a plurality of surface elements (surfels) based on the portion of the plurality of depth images, the plurality of surfels representing the real-world space and storing the generated plurality of surfels.

For example, the method can further include receiving a data structure including depth information, position information, and direction information rendering the data structure as a third depth image and blending the third depth image with the real-world image. The method can further include receiving a plurality of surfels representing the real-world space rendering the plurality of surfels as a third depth image and blending the third depth image with the real-world image. The combining of the AR object in the real-world image can include replacing a portion of pixels in the real-world image with a portion of pixels in the AR object based on depth. The blending of the stored first depth image with the second depth image can include replacing a portion of pixels in the second depth image with a portion of the stored first depth image. The second depth image can be missing at least one pixel and blending the stored first depth image with the second depth image can include replacing the at least one pixel with a portion of the stored first depth image. The method further includes receiving a plurality of surfels representing the real-world space and rendering the plurality of surfels. The second depth image can be missing at least one pixel, and the method further includes replacing the at least one pixel with a portion of the rendered plurality of surfels. The stored first depth image can include a position confidence indicating a likelihood that the first depth image represents the real-world space at a position.

In another general aspect, an apparatus, including one or more processors, and a memory storing instructions, a device, a system, a non-transitory computer-readable medium (having stored thereon computer executable program code which can be executed on a computer system), and/or a method can perform a process with a method including receiving a depth data associated with a frame of an augmented reality (AR) application, the depth data representing at least a portion of a real-world space storing the depth data as one of a plurality of depth images representing frames of the AR application in a buffer associated with the AR application selecting a portion of the plurality of depth images stored in the buffer generating a data structure based on the portion of the plurality of depth images, the data structure representing the real-world space, the data structure including depth information, position information, and direction information and storing the generated data structure.

Implementations can include one or more of the following features. For example, the data structure can include a plurality of surface elements (surfels). The data structure can be stored in association with a server. The selecting of the portion of the plurality of depth images can include selecting the plurality of images from a plurality of buffers on a plurality of devices executing the AR application. The stored depth data can include a position confidence indicating a likelihood that the depth data represents the real-world space at a position.

In still another general aspect, an apparatus, including one or more processors, and a memory storing instructions, a device, a system, a non-transitory computer-readable medium (having stored thereon computer executable program code which can be executed on a computer system), and/or a method can perform a process with a method including receiving a first depth data associated with a frame of an augmented reality (AR) application, the first depth data representing at least a portion of a real-world space receiving a data structure representing at least a second portion of the real-world space associated with the AR application, the data structure including depth information, position information, and direction information generating a real-world image by blending, at least, the first depth data with the data structure receiving an AR object combining the real-world image with the AR object and displaying the real-world image combined with the AR object.

Implementations can include one or more of the following features. For example, the combining of the AR object in the real-world image can include replacing a portion of pixels in the real-world image with a portion of pixels in the AR object based on depth. The blending of the stored first depth data with the data structure can include replacing a portion of pixels in the second depth image with a portion of the stored first depth image. The first depth data can be missing at least one pixel and blending the first depth data with the data structure can include replacing the at least one pixel with a portion of the data structure. The data structure can include a plurality of surface elements (surfels). The data structure can include a plurality of surfels, and the first depth data can be missing at least one pixel, the method can further include replacing the at least one pixel with a portion of the plurality of surfels. The data structure representing the real-world space can include a position confidence indicating a likelihood that the depth data represents the real-world space at a position. The data structure can be received from a server.

While example embodiments may include various modifications and alternative forms, embodiments thereof are shown by way of example in the drawings and are described in detail above. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:

receiving a first depth image associated with a first frame of an augmented reality (AR) application, the first depth image including depth layers and the first depth image representing at least a first portion of a real-world space;

generating a blended depth image by, identifying missing or invalid depth information in a first depth layer of the first depth image, identifying a second depth image from a buffer associated with the AR application, the second depth image including a second depth layer corresponding to the first depth layer and including the missing or invalid depth information and the buffer stores depth images associated with frames captured before the first frame, projecting the second depth image into a perspective associated with the first depth image, and using the first depth image and depth information from the second depth image that has been projected and corresponds to the missing or invalid depth information of the second depth layer to generate the blended depth image; and displaying an AR object combined with a real-world image generated based on the blended depth image.

2. The method of claim 1, wherein the second depth image is one of a plurality of depth images representing frames of the AR application stored in the buffer.

3. The method of claim 1, wherein the second depth image is one of a plurality of depth images representing frames of the AR application stored in the buffer, the method further comprising:

accumulating the plurality of depth images including projecting at least one stored frame into a current frame;

selecting one of the plurality of depth images stored in the buffer as the second depth image;

generating a data structure based on the second depth image, the data structure representing the real-world space, the data structure including depth information, position information, and direction information; and storing the data structure.

4. The method of claim 1, wherein the second depth image is one of a plurality of depth images representing frames of the AR application stored in the buffer, the method further comprising:

receiving a portion of the plurality of depth images stored in the buffer;

generating a plurality of surface elements (surfels) based on the portion of the plurality of depth images, the plurality of surfels representing the real-world space; and storing the plurality of surfels.

5. The method of claim 1, further comprising:

receiving a data structure including depth information, position information, and direction information, the depth information including the depth layers; and rendering the data structure as the second depth image including aligning the direction information based on a direction associated with the first depth image, wherein generating the blended depth image includes:

identifying a depth layer of the first depth image that includes the missing or invalid depth information as the first depth layer, and generating the blended depth image includes using the data structure to identify a corresponding depth layer of the second depth image as the second depth layer, and replacing a portion of the first depth layer to generate the blended depth image; and blending the blended depth image with the real-world image.

6. The method of claim 1, further comprising:

receiving a plurality of surfels representing the real-world space;

rendering the plurality of surfels as a third depth image; and blending the third depth image with the real-world image.

7. The method of claim 1, further comprising:

combining the real-world image with the AR object by replacing a portion of pixels in the real-world image with a portion of pixels in the AR object based on depth.

8. The method of claim 1, wherein the generating of the blended depth image includes replacing a portion of pixels in the first depth image with a portion of the second depth image.

9. The method of claim 1, wherein the missing or invalid depth information corresponds to at least one pixel; and the generating of the blended depth image includes replacing the at least one pixel with a portion of the first depth image.

10. The method of claim 1, further comprising:

receiving a plurality of surfels representing the real-world space; and rendering the plurality of surfels, wherein the first depth image is missing at least one pixel, and the generating of the blended depth image includes replacing the at least one pixel with a portion of the plurality of surfels.

11. The method of claim 1, wherein the first depth image includes a position confidence indicating a likelihood that the second depth image represents the real-world space at a position.

12. A method comprising:

receiving a depth data associated with a frame of an augmented reality (AR) application, the depth data representing at least a portion of a real-world space, the depth data including depth layers and a perspective;

storing the depth data as one of a plurality of depth images representing frames of the AR application in a buffer associated with the AR application;

identifying missing or invalid depth information in a depth layer of the depth data;

selecting a portion of the plurality of depth images corresponding to depth layer including the missing or invalid depth information from the plurality of depth images stored in the buffer, the plurality of depth images associated with frames captured before the frame;

projecting the portion of the plurality of depth images into the perspective associated with the depth data by replacing the missing or invalid depth information in the depth layer of the depth data;

generating a data structure based on the depth data and the projected portion of the plurality of depth images, the depth data being received later in time than the portion of the plurality of depth images, the data structure representing the real-world space, the data structure including depth information, position information, and direction information; and storing the generated data structure.

13. The method of claim 12, wherein the selecting of the portion of the plurality of depth images includes selecting the plurality of images from a plurality of buffers on a plurality of devices executing the AR application.

14. The method of claim 12, wherein the plurality of depth images include a position confidence indicating a likelihood that the depth data represents the real-world space at a position.

15. A method comprising:

receiving a depth data associated with a frame of an augmented reality (AR) application, the depth data including first depth layers and the depth data representing at least a first portion of a real-world space;

receiving a data structure representing at least a second portion of the real-world space associated with the AR application, the data structure including second depth layers including depth information, position information, and direction information, the data structure being generated by accumulating a plurality of depth images including projecting at least one stored frame into a current frame based on a direction associated with the depth data;

generating a blended depth image by, identifying missing or invalid depth information in a depth layer of the depth data, and using the depth information from a corresponding depth layer of the data structure that corresponds to the missing or invalid depth information to generate the blended depth image the depth data being received later in time than the depth information associated with the data structure; and displaying an AR object combined with a real-world image generated based on the blended depth image.

16. The method of claim 15, further comprising:

combining the real-world image with the AR object by replacing a portion of pixels in the real-world image with a portion of pixels in the AR object based on depth.

17. The method of claim 15, wherein the generating of the blended depth image includes replacing a portion of pixels in the depth data with a portion of the data structure.

18. The method of claim 15, wherein the depth data is missing at least one pixel; and the generating of the blended depth image includes replacing the at least one pixel with a portion of the data structure.

19. The method of claim 15, wherein the data structure includes a plurality of surfels, and the depth data is missing at least one pixel, the method further comprising replacing the at least one pixel with a portion of the plurality of surfels.

20. The method of claim 15, wherein the data structure representing the real-world space includes a position confidence indicating a likelihood that the depth data represents the real-world space at a position.

* * * * *